(12) United States Patent
Stuck

(10) Patent No.: US 10,375,693 B2
(45) Date of Patent: Aug. 6, 2019

(54) PHASED ARRAY RADIO FREQUENCY NETWORK FOR MOBILE COMMUNICATION

(71) Applicant: The Boeing Company, Chicago, IL (US)

(72) Inventor: Gary D. Stuck, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 15/212,136

(22) Filed: Jul. 15, 2016

(65) Prior Publication Data

US 2018/0020440 A1   Jan. 18, 2018

(51) Int. Cl.
*H04W 72/04* (2009.01)
*H04B 7/06* (2006.01)
*H04L 29/06* (2006.01)
*H04W 16/28* (2009.01)
*H04W 28/06* (2009.01)
(Continued)

(52) U.S. Cl.
CPC ........ *H04W 72/046* (2013.01); *H04B 7/0617* (2013.01); *H04L 69/22* (2013.01); *H04W 16/28* (2013.01); *H04W 28/06* (2013.01); *H04W 28/065* (2013.01); *H04W 40/06* (2013.01); *H04W 40/20* (2013.01); *H04W 40/34* (2013.01)

(58) Field of Classification Search
CPC ....... H04L 49/20; H04L 49/351; H04L 25/49; H04L 43/0811; H04L 43/10; H04L 49/15; H04L 12/40; H04L 12/40156; H04L 12/413; H04L 1/0083; H04L 25/14; H04L 43/0864; H04L 43/106; H04L 47/10; H04L 47/41; H04L 49/25; H04L 49/30

USPC .......................................................... 370/465
See application file for complete search history.

(56) References Cited

U.S. PATENT DOCUMENTS 5,933,410 A    8/1999  Nakane et al.
6,005,885 A    12/1999 Warren et al.
(Continued)

FOREIGN PATENT DOCUMENTS

EP    0 987 837    3/2000

OTHER PUBLICATIONS

Wang et al., "Satellite Payload Architectures for Wideband Communications Systems", Military Communications Conference Proceedings, MILCOM, 1999, pp. 865-869, IEEE (vol. 2), Atlantic City, New Jersey.

*Primary Examiner* — Natasha W Cosme
(74) *Attorney, Agent, or Firm* — Haynes and Boone, LLP

(57) ABSTRACT

Systems and methods according to one or more embodiments are provided for routing wireless mobile communication signals using a phased array communication network. In one example, a system includes a plurality of phased array antennas configured to receive an RF modulated data packet. The RF modulated data packet includes a header and payload data. A demodulator circuit is provided to demodulate the header to identify route information while maintaining the payload data in RF modulated format. The phased array antennas are configured to transmit a high bandwidth narrow antenna beam comprising the RF modulated data packet in accordance with the route information. Maintaining the payload data in RF modulated format during the route provides for high bandwidth and high data rate transmission required of today's wireless mobile communication networks.

28 Claims, 16 Drawing Sheets

(51) Int. Cl.
*H04W 40/06* (2009.01)
*H04W 40/20* (2009.01)
*H04W 40/34* (2009.01)

(56) References Cited

U.S. PATENT DOCUMENTS

| | | |
|---|---|---|
| 6,157,621 A | 12/2000 | Brown et al. |
| 7,020,462 B1 | 3/2006 | Wesel |
| 7,068,616 B2 | 6/2006 | Chang et al. |
| 8,948,149 B2 | 2/2015 | Foxworthy et al. |
| 2003/0207684 A1* | 11/2003 | Wesel ............... H04B 7/18578 455/427 |
| 2006/0035676 A1* | 2/2006 | Sayers .................. H01Q 1/246 455/562.1 |
| 2012/0027119 A1* | 2/2012 | Shearer ............... H04L 27/0008 375/295 |
| 2013/0101013 A1 | 4/2013 | Kim et al. |
| 2016/0113016 A1 | 4/2016 | Kim et al. |

* cited by examiner

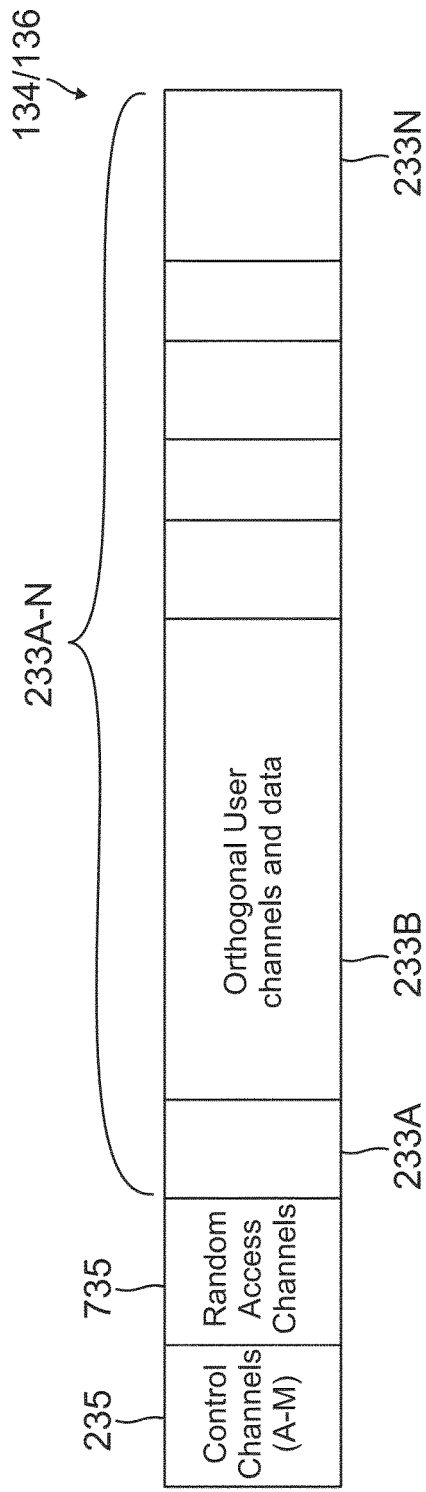
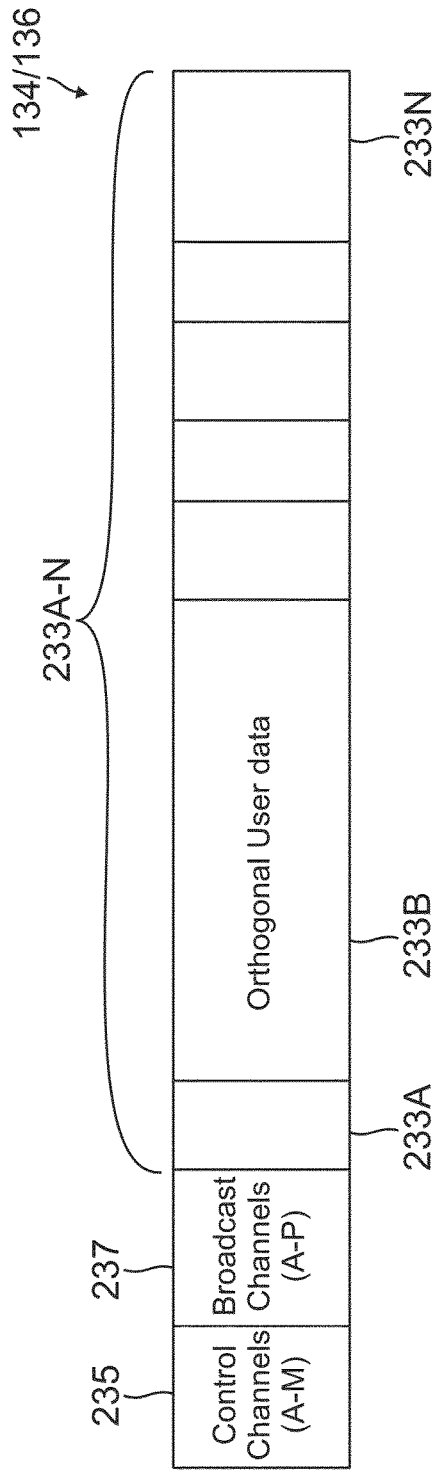

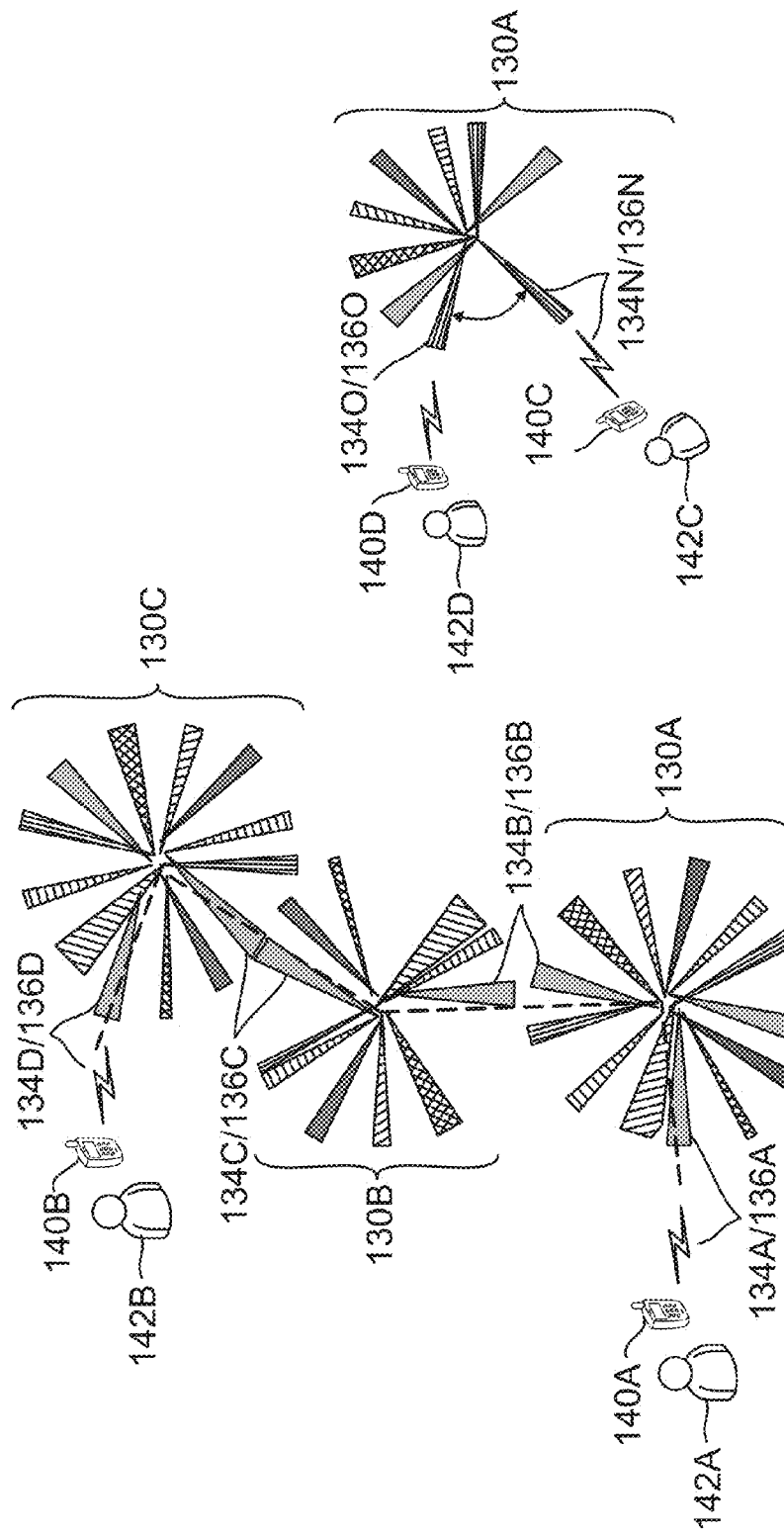

PHASED ARRAY RADIO FREQUENCY NETWORK FOR MOBILE COMMUNICATION

TECHNICAL FIELD

The present invention relates generally to mobile communications networks and, more particularly, for example, to using high bandwidth radio frequency phased array antennas for mobile communications networks.

BACKGROUND

In the field of mobile communications, there is an ongoing effort to provide for increased capacity and frequency bandwidth for wireless mobile communications networks. Advancements in mobile wireless technology and the explosive growth in the number of wireless mobile devices and users are creating a demand on existing wireless communication networks.

Thus, there is a need to support the growing demand of both mobile voice and data communications. This is particularly acute in urban areas where there is a concentration of wireless mobile devices, causing crowding and overlaps of existing wireless frequency spectrum. Unfortunately, current wireless mobile communications networks lack the coverage, capacity, and bandwidth necessary to support wireless communication network needs.

Some conventional wireless communication techniques rely on fixed cellular antenna locations using omnidirectional antennas. Omnidirectional antennas typically radiate RF power in all azimuth directions. However, omnidirectional antennas lack coverage in areas directly above and below the antenna. Furthermore, signal interference and signal overlap becomes an issue when a large number of fixed cellular omnidirectional antennas are deployed in densely populated areas.

Directional antennas provide for line-of-sight coverage. The typical directional antenna cell is divided into 3 sectors of 120 degrees. Directional antennas provide for expanded coverage. However, existing directional antennas are limited in bandwidth and data rate to support a large number of subscribers and wireless devices technology. Furthermore, many cell sites are needed in large densely populated areas to provide sufficient capacity. Unfortunately, locations for large cell towers are limited in metropolitan areas.

Future demands on wireless network capacity and bandwidth are expected to increase as wireless technologies advance and subscriber numbers continue to grow. Accordingly, there is a need for an improved wireless mobile communication network implementation that provides high bandwidth and data rate for mobile voice and data communications.

SUMMARY

Systems and methods are disclosed herein in accordance with one or more embodiments that provide an improved approach to wireless mobile communications using a radio frequency (RF) phased array communication network to provide for high bandwidth and high data rate mobile voice and data communications. In some embodiments, an RF phased array communication network is implemented as a plurality of access nodes. Each access node includes a plurality of RF phased array antennas to provide RF communication between wireless mobile devices.

In one embodiment, a method includes receiving, by a first phased array antenna beam at an access node of a phased array communication network, a radio frequency RF modulated data packet comprising a header and payload data; demodulating the header while maintaining the payload data in RF modulated format; identifying route information within the demodulated header; and transmitting, by a second phased array antenna beam from the access node in accordance with the route information, the RF modulated data packet.

In another embodiment, a system includes a first antenna configured to receive a first phased array antenna beam comprising a radio frequency RF modulated data packet, wherein the RF modulated data packet comprises a header and payload data; a demodulator circuit configured to demodulate the header of the RF modulated data packet, while maintaining the payload data in RE modulated format, to identify route information; and a second antenna configured to transmit a second phased array antenna beam comprising the RF modulated data packet in accordance with the route information.

In another embodiment, a method includes generating, by a source device, a data packet comprising a header and payload data, wherein the header identifies the source device and a destination device, wherein the payload data comprises data to be transmitted from the source device to the destination device over a phased array communication network; modulating, by the source device, the data packet to provide a radio frequency RF modulated data packet; and transmitting, by the source device, a phased array antenna beam comprising the RF modulated data packet to an access node of the phased array communication network.

In another embodiment, a device includes a memory configured to store a plurality of executable instructions; a processor configured to execute the instructions to generate a data packet comprising a header and payload data, wherein the header identifies the device and a destination device, wherein the payload data comprises data to be transmitted from the device to the destination device over a phased array communication network; a modulator circuit configured to radio frequency RF modulate the data packet; and an antenna configured to transmit a phased array antenna beam comprising the RF modulated data packet to an access node of the phased array communication network.

In another embodiment, a method includes receiving, at a control server, a request to access a phased array communication network; allocating, by the control server, a communication channel; identifying, by the control server, route information associated with the communication channel; and transmitting, by the control server to an access node of the phased array communication network, a response to the request, wherein the response identifies the communication channel and the route information.

In another embodiment, a control server includes a memory configured to store a plurality of executable instructions; and a processor configured to execute the instructions to: process a request to access a phased array communication network; allocate a communication channel; identify route information associated with the communication channel; and transmit to an access node of the phased array communication network, a response to the request, wherein the response identifies the communication channel and the route information.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 7A and 7B illustrate various channels and data included within antenna beams in accordance with embodiments of the disclosure.

FIG. 9A illustrates an example of a route path through a plurality of access nodes in accordance with an embodiment of the disclosure.

FIG. 9B illustrates an example of a route path through a single access node in accordance with an embodiment of the disclosure.

DETAILED DESCRIPTION

Figure 1:
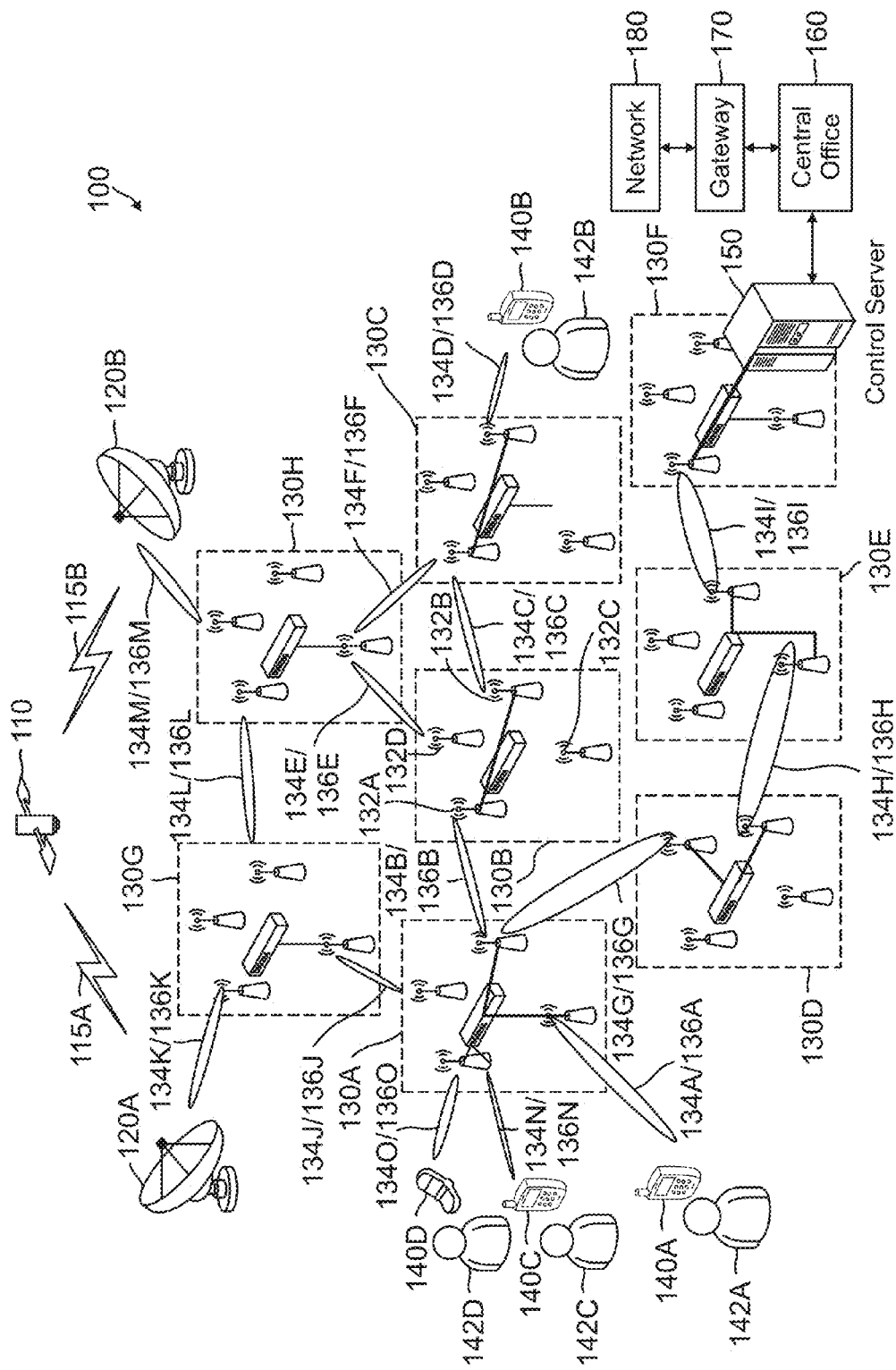
FIG. 1 illustrates a phased array communication network in accordance with an embodiment of the disclosure.

Embodiments of the present disclosure provide for a phased array communication network that provides high bandwidth and high data rate for wireless mobile communications. The phased array communication network provides for a large number of access nodes distributed throughout the network. Access nodes include many small phased array antennas with the capability to transmit or receive a multitude of radio frequency (RF) signals for voice and data communication between wireless mobile devices. RF modulated data packets comprising data and/or voice communications are routed through one or more access nodes from a source device to a destination device based on a route path.

In various embodiments, a phased array antenna of an access node receives an RF modulated data packet comprising a header and payload data. The header is decoupled from the payload data and demodulated to identify a destination device and route information. In this regard, only the header is demodulated, while the payload data remains modulated at the RF carrier frequency. The RF modulated data packet is routed at the RF carrier frequency to other identified access nodes and demodulated at the destination device. Thus, high data rates and wide bandwidth may be realized by maintaining the payload data at the RF modulated frequency during the route. Furthermore, by maintaining high data rates, routing congestion is reduced.

In some embodiments, a route path is predefined from a source device, through one or more access nodes, to a destination device. In this regard, the header is demodulated to identify the access node associated with the route path and the RF modulated data packet is routed at the RF carrier frequency through the identified access nodes.

In some embodiments, a header is demodulated at the access node to identify the destination device and a shortest route path is determined from a plurality of access nodes based on the destination device location. Significantly, the RF modulated data is routed at the RF carrier frequency throughout the route path.

In some embodiments, a route path is congested resulting in a transmission delay. Transmission delay information is provided by a control server to each access node within the phased array antenna communications network. An access node may identify at least one different access node to reduce the transmission delay and reconfigure route information to add the different access node. The header is updated with the reconfigured route information and remodulated to RF frequency. Furthermore, the RF modulated data packet is routed to the destination device in accordance with the reconfigured route information thereby reducing route congestion.

In some embodiments, an RF modulated data packet is electronically steered from a source device to a destination device through the phased array communication network. In this regard, a phased array antenna beam including the RF modulated data packet generated at an access node is electronically beamsteered toward another access node identified in the route information and/or the destination device identified in the data packet header. The antenna beam is formed within one or more of the phased array antennas to provide a high bandwidth narrow RF beam. High bandwidth narrow RF beams provide directivity of the RF data packet toward the receiving access node and/or destination device. Furthermore, highly directive narrow beams reduce cochannel interference and allow reuse of beam frequency in non-adjacent access nodes to increase the communication network capacity.

The phased array antenna small size allows for a plurality of phased array antennas to be incorporated into each access node to provide many voice and data communications simultaneously. As a result, an increased capacity in large urban areas is realized. Furthermore, many access nodes can be deployed throughout a densely populated area mounted on existing infrastructures such as light poles, traffic signals and buildings, for example.

In various embodiments, the mobile communications techniques described herein may be advantageously used to provide for high bandwidth and data rate communications between wireless mobile devices in densely populated areas. For example, maintaining payload data at the RF modulated frequency along a route path through the communication network provides for high data rates and wide bandwidth necessary to support wireless communication network needs. Capability to reconfigure a route based on a transmission delay maintains capacity of the communication network. Furthermore, electronically beamsteering high bandwidth narrow RF beams allows reuse of beam frequencies in non-adjacent access nodes to increase the wireless communication network capacity. Additionally, existing infrastructure may easily accommodate access nodes which include a large number of small phased array antennas to transmit and receive a multitude of RF frequency modulated voice and data transmissions.

FIG. 1 illustrates a phased array communication network 100 in accordance with an embodiment of the disclosure. A phased array communication network 100 is adapted to provide high bandwidth and data rate voice and data communications among users 142A-D of wireless mobile devices 140A-D (e.g., user devices). Phased array communication network 100 consists of a plurality of access nodes 130A-H. Access nodes 130A-H are distributed throughout communications network 100 to provide high bandwidth narrow radio frequency (RF) antenna beams 134A-M for voice and data transmission from source device 140 to destination device 140. Furthermore, access nodes 130A-H provide high bandwidth narrow radio frequency (RF) antenna beams 136A-M for voice and data transmission from destination device 140 to source device 140.

In various embodiments, access nodes 130A-H receive and transmit RF modulated antenna beams 134A-M and 136A-M via a plurality of RF phased array antennas 132, for example, phased array antennas 132A-D of access node 130B. It will be appreciated each access node 130A-H of phased array communication network 100 may provide more or fewer phased array antennas 132 and the number of RF phased array antennas 132 shown in FIG. 1 is for illustrative purposes only. In this regard, each access node 130A-H provides a plurality of RF phased array antennas 132 for receiving RF antenna beams 134A-M and 136A-M. Each access node 130 provides a plurality of RF phased array antennas 132 for transmitting RF antenna beams 134A-M and 136A-M. In this regard, phased array communication network 100 provides for a duplex antenna system configured with separate receive and transmit RF phased array antennas 132 to reduce signal interference between phased array antenna RF signals.

Source device 140A may establish a communication with destination device 140B through phased array communication network 100 access nodes 130A-C. In this regard, a route path of RF antenna beams 134A-D provided by phased array antennas 132 of access nodes 130A-D provide a communication link between source device 140A and destination device 140B.

In various embodiments, the route path between source device 140A and destination device 140B may be congested with a number of source and destination devices 140 communications resulting in a transmission delay. In this regard, the route path between source device 140A and destination device 140B may be reconfigured to reduce the transmission delay. An alternate route path may be chosen from access node 130B to access node 130H where antenna beam 134E from access node 130B is routed to access node 130H. Antenna beam 134F from access node 130H is routed to access node 130C. The route path continues to access node 130C and to destination device 140B to complete the route. In this regard, phased array communication network 100 provides for efficient RF signal routing to maintain communication network capacity.

Figure 2:
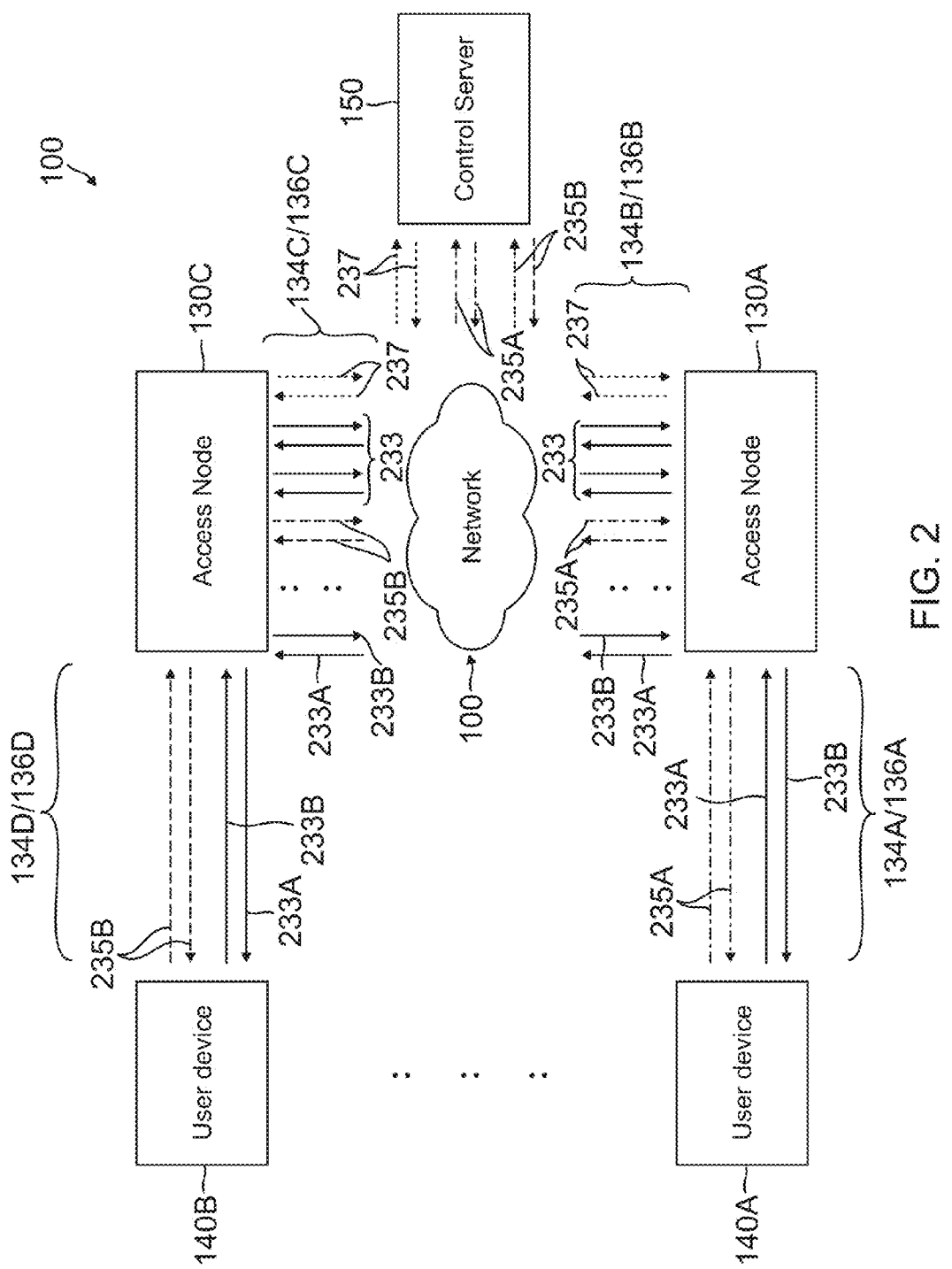
FIG. 2 illustrates a user device interface to a phased array communication network in accordance with an embodiment of the disclosure.

In some embodiments, a route path through phased array antenna communications network 100 may be initiated at source device 140A and routed to a control server 150 (e.g., via antenna beams 134A and 134G-I). For example, source device 140A may request access to phased array communication network 100 via a control channel (e.g., such as control channel 253 as shown in FIG. 2). In this regard, access nodes 130A and 130D-F route the request for access to control server 150. Access node 130F may provide a connection to control server 150 to complete the route. In the same manner, control server 150 may provide a response to the request to access via control channel 235 through access nodes 130F-D and 130A (e.g., via antenna beams 136I-G and 136A).

In some embodiments, access nodes 130 provide transmission through a satellite link. In this regard, source device 140A may communicate with destination device 140B through satellite 110. In some embodiments, satellite 110 is a Low Earth Orbit (LEO) satellite. A communication initiated by source device 140A may be transmitted through access node 130A to access node 130G. Access node 130G may transmit the communication via antenna beam 134K to a satellite gateway 120A. Satellite gateway 120A may transmit the communication to satellite 110 via an uplink antenna beam 115A. Satellite 110 may process the communication and route the communication to satellite gateway 120B via a downlink antenna beam 115B. Satellite gateway 120B may transmit the communication to access node 130H via antenna beam 134M. The communication is routed from access node 130H to access node 130C and to destination device 140B to complete the route.

In some embodiments, access node 130 may provide high RF power for direct communication with satellite 110. For example, access nodes 130G and 130H may be configured as high RF power access nodes 130 capable of transmitting and receiving antenna beams 134/136 to communicate directly with satellite 110. In this regard, access node 130G may transmit uplink antenna beam 115A directly to satellite 110. Satellite 110 may process the communication and route satellite downlink antenna beam 115B directly to access node 130H. Furthermore, the communication is routed from access node 130H to access node 130C and to destination device 140B to complete the route.

In some embodiments, a single access node 130 may provide a route between source device 140 and destination device 140. For example, both source device 140C and destination device 140D may be within RF signal proximity of access node 130A. Access node 130A may provide transmit and receive phased array antennas 132 to enable a communication link between source device 140C and destination device 140D. While both source device 140C and destination device 140D remain within RF signal proximity, access node 130A provides a communication link.

Control server 150 may be in communication with a central office 160 to provide an interface between phased array communication network 100 and an external network 180. Central office 160 may be coupled to gateway 170 to provide a communication link to network 180. Network 180 may be one of many available networks providing mobile wireless communication services to subscribers. In this regard, phased array communication network 100 may provide to source devices 140 a communication link to subscribers of network 180.

FIG. 2 illustrates a user device 140 interface to a phased array communication network 100 in accordance with an embodiment of the disclosure. In this illustrated embodiment, source device 140A and destination device 140B interface with phased array communication network 100 access node 130A and 130C, respectively for bi-directional real time communication. Similarly, control server 150 interfaces with phased array communication network 100 via broadcast channel 237 and a plurality of control channels 235 (e.g., control channels 235A and 235B) for bi-directional real time communication.

In various embodiments, access node 130A provides communication with source device 140A through antenna beams 134A and 136A. In this regard, antenna beam 134A is directed toward access node 130A from source device 140A and antenna beam 136A is directed toward source device 140A from access node 130A. Antenna beams 134A/136A include an RF modulated communication channel 233A/233B and an RF modulated control channel 235A. Communication channel 233A/233B provides for bi-directional RF modulated voice and/or data transmission between devices 140A and 140B, for example. Control channel 235A is provided by control server 150. In general, control channels 235 provide for bi-directional real time communication between devices 140, access nodes 130 and control server 150.

As illustrated in FIG. 2, access node 130A provides bi-directional communication with other access nodes 130 of phased array communication network 100 through antenna beams 134B and 136B. Antenna beams 134B and 136B comprise a plurality of communication channels 233 (e.g., communication channels 233A/233B associated with devices 140A/140B and other communication channels 233 associated with other devices 140), at least one control channel 235A associated with source device 140A, and broadcast channel 237. Broadcast channel 237 is provided by control server 150 to communicate to access nodes 130 information applicable to phased array communication network 100, as discussed herein.

FIG. 2 shows access node 130C in communication with antenna beams 134C/136C. Antenna beams 134C/136C comprise a plurality of communication channels 233 (e.g., communication channels 233A/233B associated with devices 140A/140B and other communication channels 233 associated with other devices 140), control channel 235B associated with source device 140B and broadcast channel 237. Access node 130C is in communication with destination device 140B via antenna beams 134D/136D. Antenna beams 134D/136D include communication channel 233A/233B and control channel 235B data. As discussed, communication channel 233A/233B provides bi-directional voice and/or data transmission between devices 140A and 140B. Control channel 235B is provided by control server 150 to provide bi-directional communication between device 140B, access node 130C and control server 150.

Figure 3:
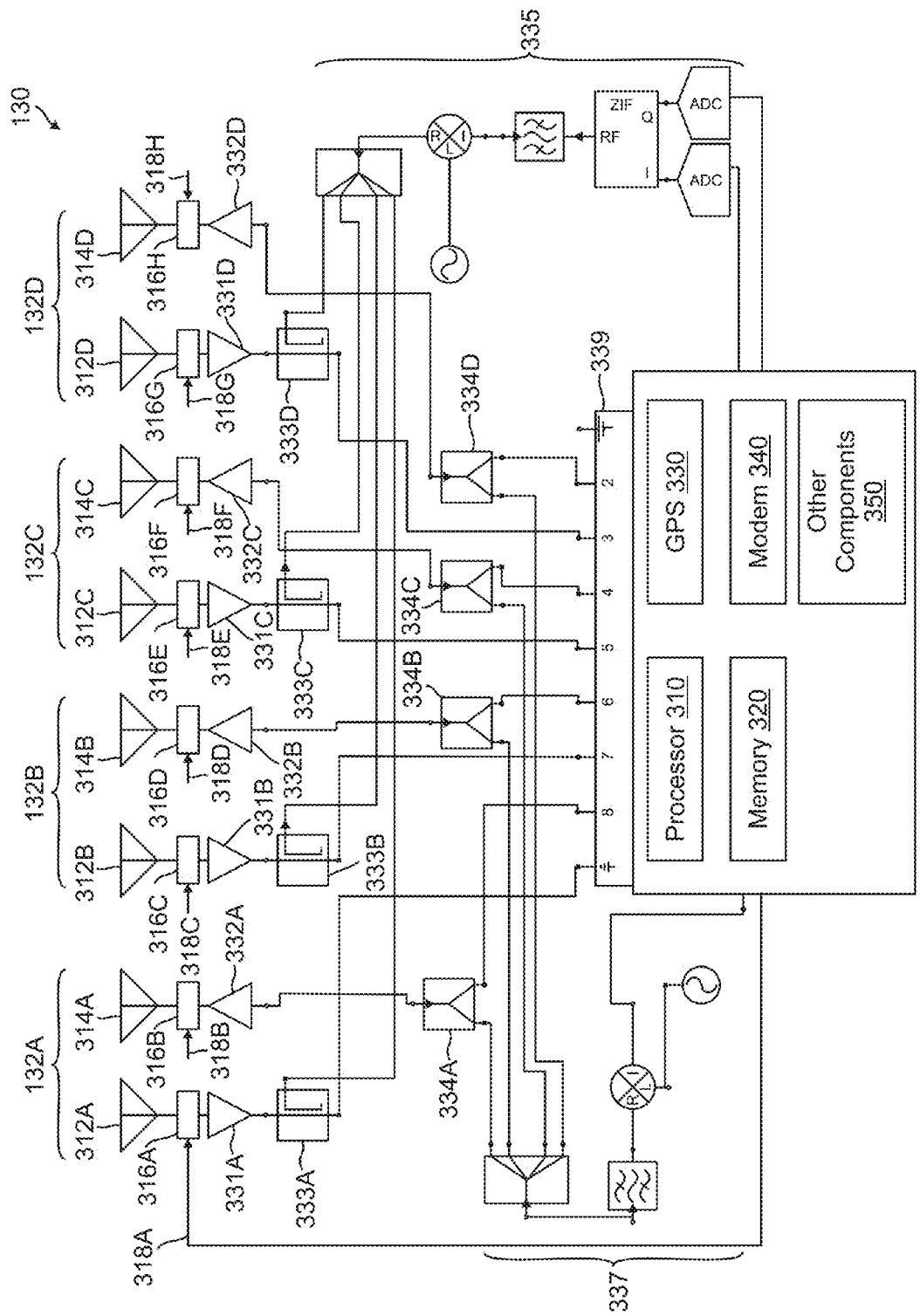
FIG. 3 illustrates a schematic of an access node in accordance with an embodiment of the disclosure.
Figure 6:
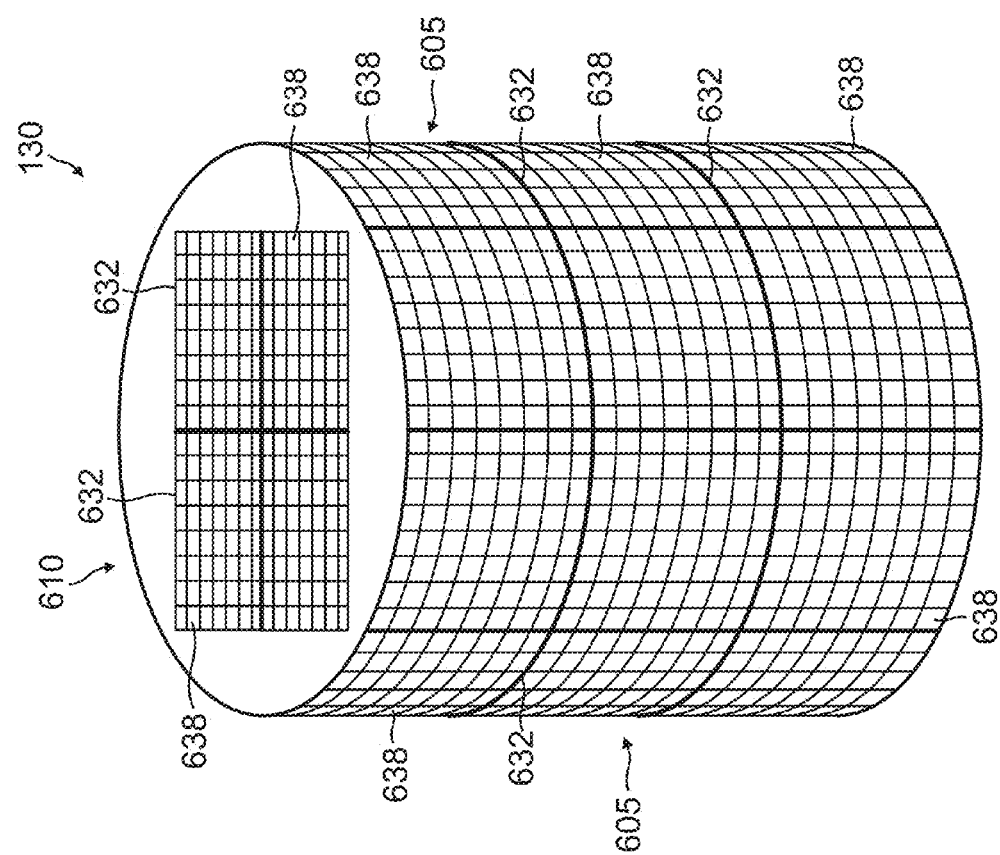
FIG. 6 illustrates a perspective view of a cylindrical access node in accordance with an embodiment of the disclosure.

FIG. 3 illustrates a schematic of an access node 130B in accordance with an embodiment of the disclosure. Access node 130B forms a part of phased array communication network 100 of FIG. 1. Access node 130B may be used to receive and transmit antenna beams 134/136. As shown, access node 130B includes a plurality of phased array antennas 132A-D. Each phased array antenna 132 includes a receive phased array antenna 312 and a transmit phased array antenna 314 to provide antenna beam 134/136 receive and transmit capability. Each phased array antenna 312 and 314 includes a plurality of antenna elements (e.g., antenna elements 638 as shown in FIG. 6). In this regard, four receive 312 and four transmit 314 antennas are provided by the embodiment of access node 130B. It should be appreciated there may be fewer or more phased array antennas 132 included with access node 130B.

Figure 8A:
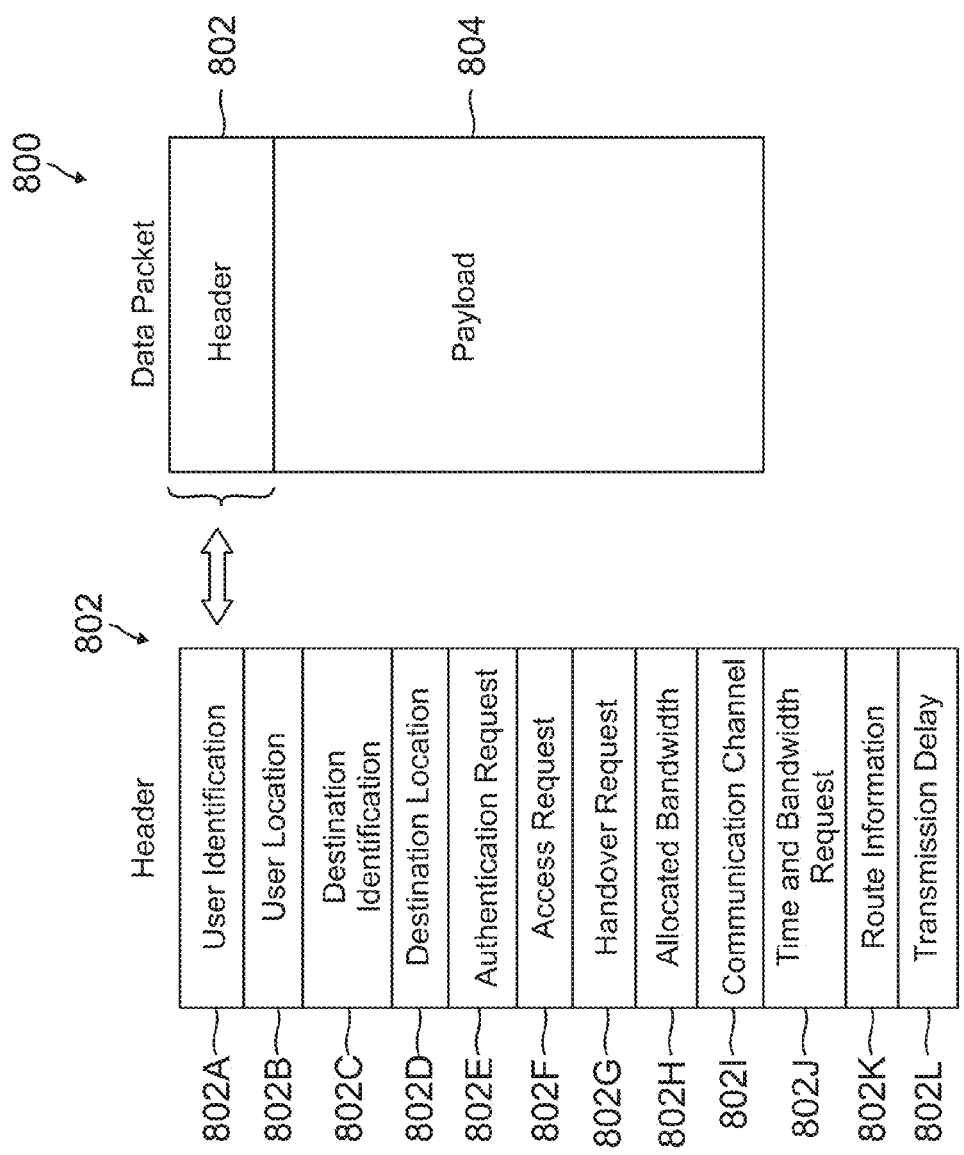
FIG. 8A illustrates a block diagram of a data packet in accordance with an embodiment of the disclosure.

In the embodiment illustrated in FIG. 3, access node 130B includes a processor 310, a memory 320, a GPS device 330, RF amplifiers 331A-D, RF amplifiers 332A-D, decouplers 333A-D, combiner 334A-D, a demodulator circuit 335, a modulator circuit 337, and a modem 340. For illustrative purposes, one receive phased array antenna, 312A, signal path will be discussed. It is understood the remaining receive phased array antennas, 312B-D, signal paths are similar. Receive phased array antenna 312A receives phased array antenna beam 134A including a plurality of RF modulated data packets (e.g., such as RF modulated data 800 as shown in FIG. 8A). RF modulated data packet 800 includes an RF modulated header (e.g., such as RF modulated header 802 as shown in FIG. 8A) and RF modulated payload data (e.g., such as RF modulated payload data 804 as shown in FIG. 8A). In some embodiments, RF modulated data packet 800 is signal processed by beam steering circuit 316A where RF modulated data packet 800 signal amplitude and phase is adjusted to provide a maximum gain in the received antenna beam 134 and reduce interfering RF signals. Processor 310 provides steering control signal 318A (through 318H) to beam steering circuit 316A (through 316H) for signal processing of RF modulated data packet 800. RF modulated data packet 800 is amplified by RF amplifier 331A. Coupler 333A is used to decouple an RF modulated header 802 portion of RF modulated data packet 800. In some embodiments, header 802 may be modulated using binary phase shift keying, however other modulation techniques are possible. Demodulator circuit 335 demodulates header 802 and provides the demodulated header to modem 340. Modem 340 decodes header 802 and provides decoded data to processor 310.

In some embodiments, RF modulated header 802 is not demodulated when received at access node 130B. In this regard, if route information 802K or other data within header (e.g., such as other data 802A-L as shown in FIG. 8A) has not been updated, demodulation is not required. In other embodiments, RF modulated header 802 may be sampled by processor 310 and demodulation is not necessary.

Processor 310 may be adapted to identify the source device 140A, the destination device 140B, and route information (e.g., such as route information 802K as shown in FIG. 8A) from demodulated header 802. Route information 802K may be transferred to memory 320 via processor 310 for storage. Processor 310 may later retrieve route information 802K from memory 320. GPS device 330 may be adapted to communicate to processor 310 to provide access node 130B geographic coordinates for use in determining a route path, as discussed herein. In some embodiments, other components 350 may include an antenna coupled to GPS device 330 to transmit geographic coordinates of access node 130B to control server 150 of phased array communication network 100. In this regard, control server 150 may use location information provided from each access node 130 within the communications network 100 to aid in RF modulated data packet 800 route determination.

Access node 130B is adapted to transmit RF modulated data 800. In this regard, transmit phased array antenna 314A-D are adapted to transmit RF modulated data 800. For illustrative purposes, one transmit phased array antenna, 314A, signal path will be discussed. In some embodiments, header 802 may be remodulated by modulator circuit 337 to provide an RF modulated header 802. In other embodiments, as discussed herein, RF modulated header has been sampled when received by access node 130B and remodulation is not required. Combiner 334A combines RF modulated header 802 with payload data 804 to form RF modulated data packet 800.

In some embodiments, route information 802K is predefined (e.g., a static route) and transmit phased array antenna 314A is selected based on the predefined route information 802K. In other embodiments, RF modulated data packet 800 is electronically steered to access node 130C and/or destination device 140B. In this regard, transmit phased array antenna 314A may be beamsteered to access node 130C and/or destination device 140B using beam steering circuit 316B. Beam steering circuit 316B provides signal processing of RF modulated data packet 800 to provide a narrow antenna beam 134 with maximum gain in the direction of transmission. Processor 310 provides steering control signal 318B to beam steering circuit 316B for signal processing of RF modulated data packet 800.

In yet another embodiment, a route path may be generated within access node 130B based on destination device 140B location, where an RF array switch matrix 339 switches transmit phased array antenna 314A toward destination device 140B to provide a shortest route path to destination device 140B. In some embodiments, processor 310 electronically steers transmit phased array antenna 314A toward destination device 140B. RF amplifier 332A amplifies RF modulated data packet 800 prior to transmission to access node 130C and/or destination device 140B.

Figures 8B, 8C:
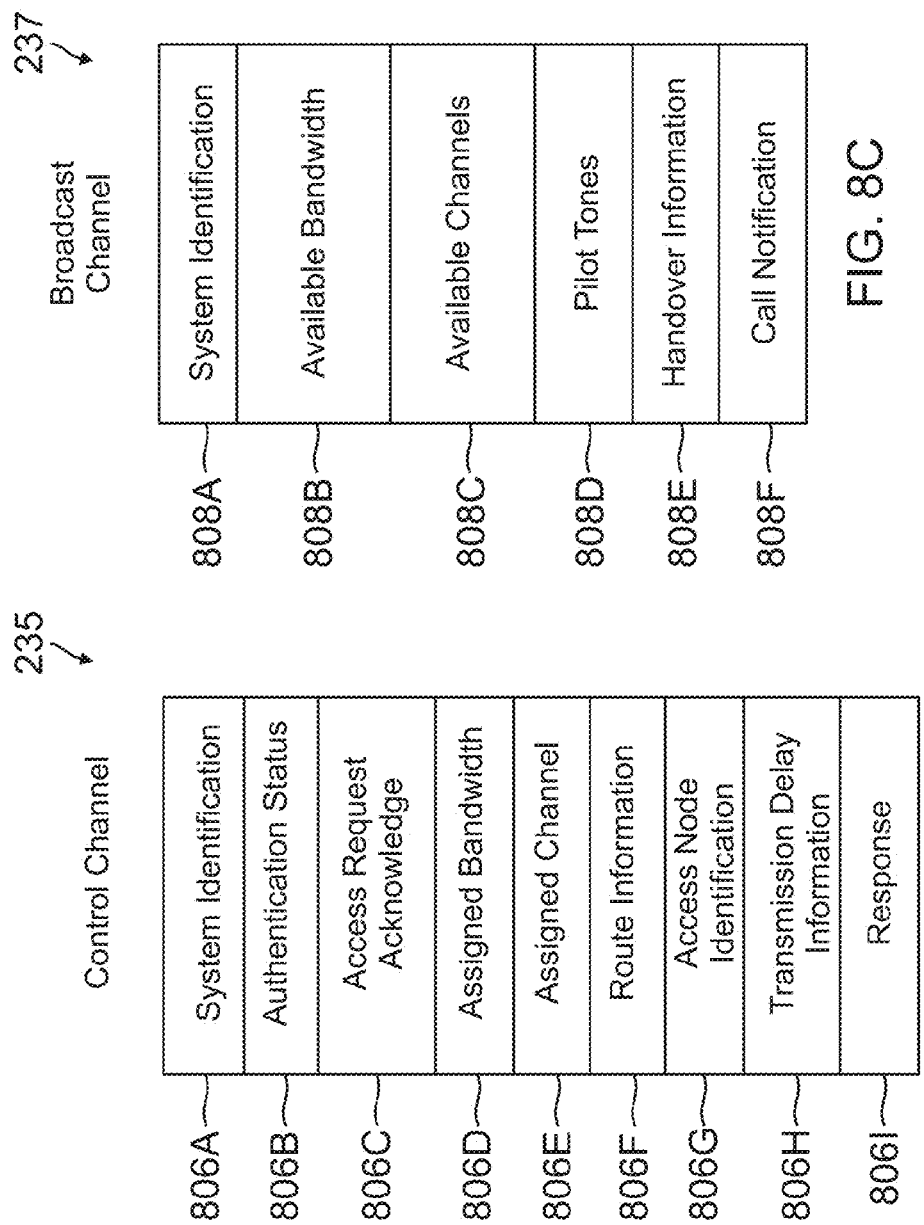
FIG. 8B illustrates a block diagram of a control channel in accordance with an embodiment of the disclosure.
FIG. 8C illustrates a block diagram of a broadcast channel in accordance with an embodiment of the disclosure.

In various embodiments, control channel 235 is received by access node 130B in RE modulated format, as discussed herein. Demodulator circuit 335 is adapted to demodulate control channel 235 to provide data 806A-I (e.g., data 806A-I as shown in FIG. 8B) to processor 310 for processing transmission delay and route information, for example. Control channel 235 may be remodulated by modulator circuit 337 prior to transmission from access node 130B via transmit phased array antenna 314A.

Figure 4:
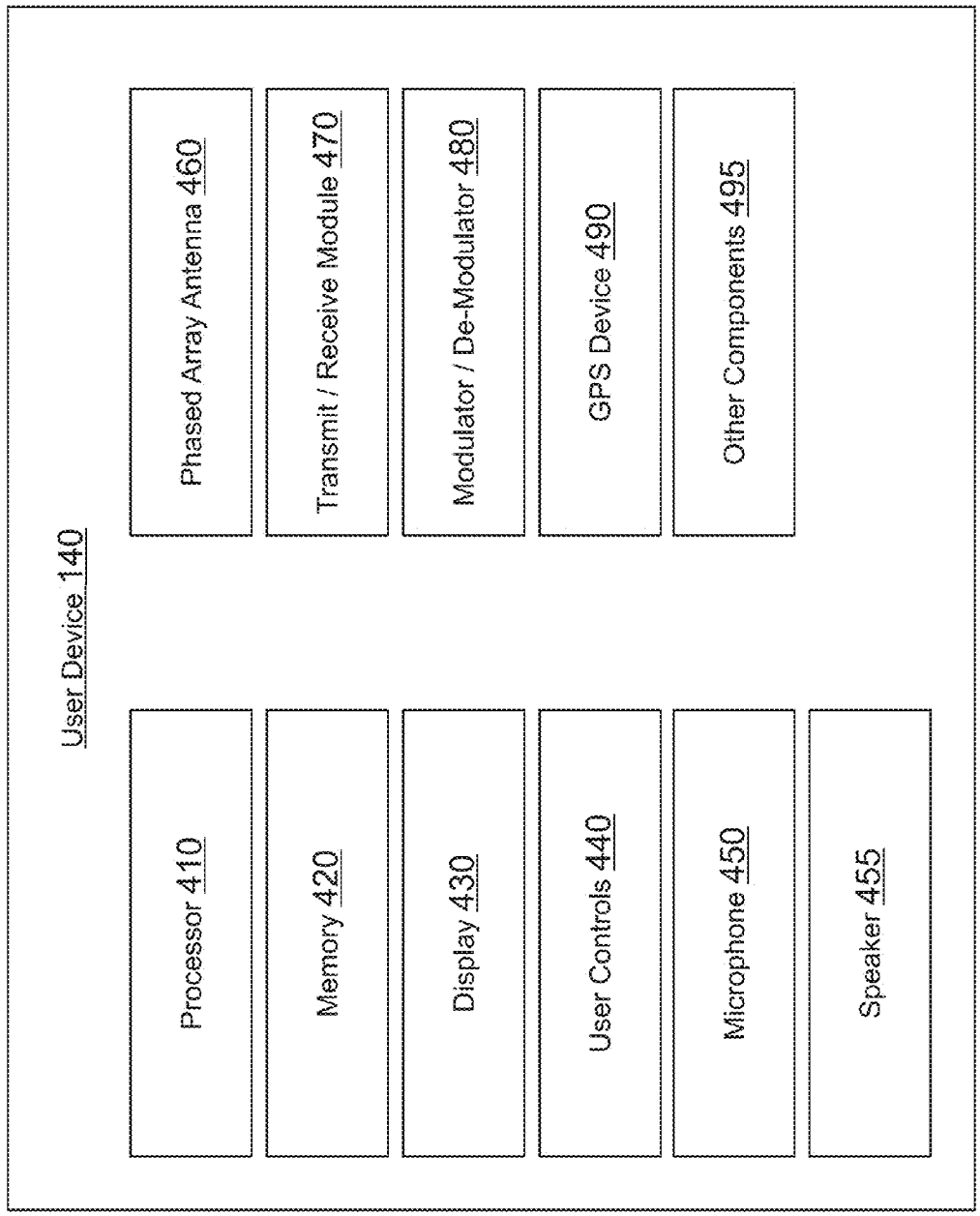
FIG. 4 illustrates a block diagram of a user device in accordance with an embodiment of the disclosure.

FIG. 4 illustrates a block diagram of a user device 140 in accordance with an embodiment of the disclosure. User device 140 generally includes source devices 140A and 140C and destination devices 140B and 140D, as discussed herein. In one embodiment, user device includes a processor 410, a memory 420, a display 430, a user controls 440, a microphone 450, a speaker 455, a phased array antenna 460, a transmit/receive module 470, a modulator/demodulator circuit 480, and a GPS device 480. Antenna 460 is preferably a phased array antenna. However, antenna 460 may be another directional, multi-element, beam steering, or beamforming antenna.

In various embodiments, user device 140 may be implemented as a portable handheld mobile telephone to communicate voice and/or data with other portable handheld mobile telephones, for example.

Processor 410 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. Processor 410 is adapted to interface and communicate with components 420, 430, 440, 450, 455, 460, 470, and 480 to perform method and processing steps as described herein.

Memory 420 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, memory is adapted to store route information 802K received from header 802 and/or route information 806F received from control channel 235.

Display 430 includes, in one embodiment, a liquid crystal display (LCD) or various other types of generally know displays. User controls 440 include, in various embodiments, a keypad. User controls may be integrated with display 430 to operate as both a user input device and a display, such as a touch screen as part of display 430. Display 430 may include display electronics, which may be utilized by processor 410 to display video or other images on display 430. Processor 410 may be adapted to sense control input signals from user controls and respond to any sensed control input signals received therefrom.

Processor 410 may be adapted to interface with microphone 450 to convert acoustic waves received at microphone 450 into electrical signals for transmission by phased array antenna 460. Similarly, RF signals received by phased array antenna are converted to low frequency electrical signals by processor 410 and transmitted to speaker 455 to convert to sound waves.

Phased array antenna 460 includes a plurality of antenna elements configured to transmit and receive antenna beams 134/136. Transmit/receive module (T/R module) 470 includes RF transmit and receive modules to amplify RF signals for transmission by phased array antenna 460 and amplify RF signals received from phased array antenna 460.

In some embodiments, a modulator portion of modulator/demodulator circuit 480 is adapted to RF modulate data packets 800 including header 802 and payload data 804, and control channel 235 prior to transmission by phased array antenna 460. Time division multiple access (TDMA), frequency division multiple access (FDMA) and/or code division multiple access (CDMA) modulation may be used to modulate payload data 804 portion of data packet 800 and control channel 235. In some embodiments, data packet 800 may be modulated using time division duplexing. However, other forms of duplexing such as frequency division duplexing are possible. In some embodiments, binary phase-shift keying (BPSK) modulation is used to modulate header 802. Demodulator portion of modulator/demodulator circuit 480 is adapted to demodulate received RF modulate data packets 800 including header 802 and payload data 804, and RF modulated control channels 235.

In some embodiments, GPS device 490 provides a location of user device 140. Other components 495 may include a GPS antenna 495 to transmit location signals of user device 140 to GPS antenna 340 of access node 130. In some embodiments, other components 495 may include an antenna 495 configured to receive antenna beams 134/136. In this regard, antenna 495 may be any stump or flex antenna capable of receiving RF antenna beams 134/136.

Processor 410 may be adapted to communicate with phased array antenna 460 (e.g., by receiving control channel information from phased array antenna 460) and providing and/or receiving command, control, and/or other information to and/or from other components of user device 140 (e.g., T/R module 470, modulator/demodulator 480, and/or GPS device 490).

Figure 5:
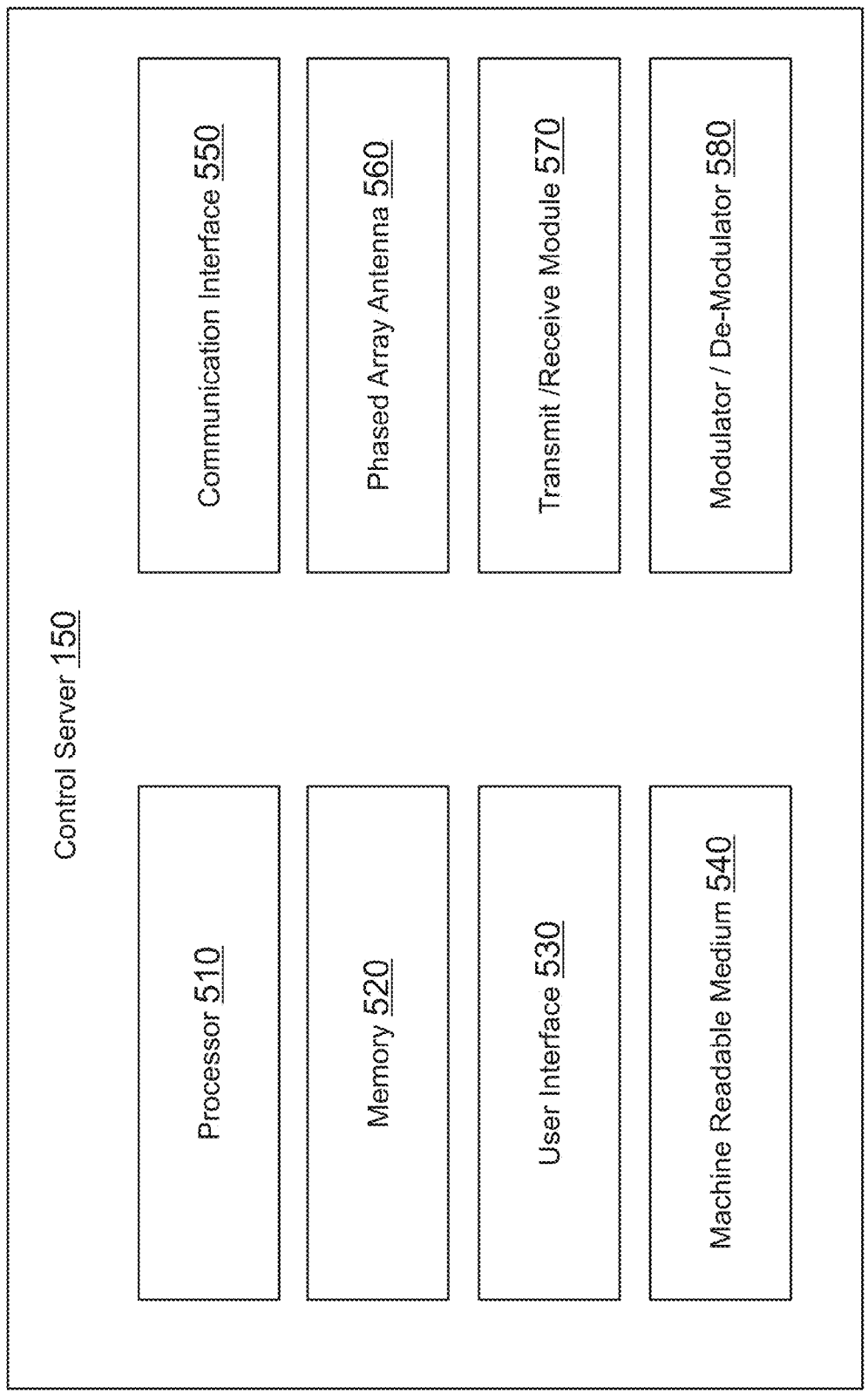
FIG. 5 illustrates a block diagram of a control server in accordance with an embodiment of the disclosure.

FIG. 5 illustrates a block diagram of a control server 150 in accordance with an embodiment of the disclosure. Control server 150 may interface with phased array communication network 100 through control channel 235 to provide responses and information to user devices 140 and access nodes 130, as discussed herein. In various embodiments, control server 150 includes a processor 510, a memory 520, a user interface 530, and a communication interface 550. In some embodiments, control server may also include a phased array antenna 560, a transmit/receive module 570 (e.g., a T/R module), and a modulator/demodulator circuit 580.

Processor 510 is similar to processor 410 of user device 140. In this regard, processor 510 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. Processor 510 is adapted to interface and communicate with components 520, 530, 540, 550, 560, 570, and 580 to perform method and processing steps as described herein.

In various embodiments, it should be appreciated that processing operations and/or instructions may be integrated in software and/or hardware as part of processor 510, or code (e.g., software or configuration data) which may be stored in memory component 520. Embodiments of processing operations and/or instructions disclosed herein may be stored by a machine readable medium 540 in a non-transitory manner (e.g., a memory, a hard drive, a compact disk, a digital video disk, or a flash memory) to be executed by a computer (e.g., logic or processor-based system) to perform various methods disclosed herein.

Memory 520 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory.

User interface 530 includes any general interface for a user input and/or interface device having one or more user actuated components, such as one or more push buttons, slide bars, rotatable knobs or a keyboard, that are adapted to generate one or more user actuated input control signals. Processor 510 may be adapted to sense control input signals from user interface 530 and respond to any sensed control input signals received therefrom.

In one embodiment, communication interface 550 may be implemented as a network interface component (NIC) adapted for communication with a network including other devices in the network. In various embodiments, communication interface 550 may include one or more wired or wireless communication interfaces, such as an Ethernet connection, a wireless local area network (WLAN) component based on the IEEE 802.11 standards, a wireless broadband component, mobile cellular component, a wireless satellite component, or various other types of wireless communication interfaces including radio frequency (RE), microwave frequency (MWF), and/or infrared frequency (IRF) components adapted for communication with a network. As such, communication interface 550 may include an antenna coupled thereto for wireless communication purposes. In other embodiments, the communication interface 550 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In another embodiment, a phased array antenna 560, a transmit/receive module 570, and a modulator/demodulator circuit 580 may be implemented similar to phased array antenna 460, transmit/receive module 470, and modulator/demodulator circuit 480 of user device 140. In this regard, phased array antenna 560, transmit/receive module 570, and modulator/demodulator circuit 580 provides a RF wireless interface to access nodes 130 for routing RF modulated control channels 235 and RE modulated broadcast channels 237 within phased array communication network 100.

FIG. 6 illustrates a perspective view of a cylindrical access node 130 in accordance with an embodiment of the disclosure. As shown in the embodiment of FIG. 6, a cylindrical access node 130 includes a plurality of phased array antennas 632 coupled to an outer surface 605. It is understood access node 130 may be implemented as a cube or any other geometric structure where a plurality of phased array antennas 632 may be coupled to an outer surface.

Each phased array antenna 632 includes a plurality of antenna elements 638. In some embodiments, a phased array antenna 632 includes sixty-four antenna elements 638 arranged in an eight by eight matrix. In other embodiments, fewer or more antenna elements 638 and antenna element 638 matrix arrangements are possible. In some embodiments, each phased array antenna 632 dimension is approximately twenty millimeter by twenty millimeter square. However, in other embodiments, phased array antenna 632 dimensions may be greater or less than twenty millimeter square. In yet another embodiment, phased array antenna 632 may be circular with a diameter of approximately twenty millimeter. However, circular phased array antennas 632 with diameters greater than and/or less than twenty millimeters are possible.

In the embodiment shown, phased array antennas 632 provide three hundred sixty degree RF antenna beam 134/136 coverage. In this regard, phased array antennas 632 provide for high capacity wireless mobile communications. Furthermore, phased array antenna 632 provides for high bandwidth electronic beamsteering of antenna beams 134/136 formed at one or more phased array antennas 632, as discussed herein. Highly directive narrow antenna beams 134/136 reduces cochannel interference and allow reuse of antenna beam 134/136 frequency in non-adjacent access nodes 130 to increase phased array communication network 100 capacity.

In some embodiments, a plurality of phased array antennas 632 may be coupled to a top surface 610 of cylindrical access node 130 to transmit uplink antenna beam 115A directly to satellite 110 and receive downlink antenna beam 115B from satellite 110. In this regard, access node 130 may be configured as high RF power access node 130 to provide for a flexible RF communication link for terrestrial and space borne wireless mobile phased array communication network 100.

FIGS. 7A and 7B illustrate various channels and data included within antenna beams 134/136 in accordance with embodiments of the disclosure. Antenna beams 134/136 are formed at phased array antenna 132 of access node 130. Access node 130 includes a plurality of phased array antennas 132 providing for a plurality of antenna beams 134/136.

Antenna beams 134/136 of FIG. 7A include a plurality of RF modulated communication channels 233A-N, a plurality of RF modulated control channels 235A-M, and a plurality of RF modulated random access channels 735 (e.g., random access channel 735 of control channel 235). Antenna beams 134/136 provide high bandwidth to provide simultaneous RF modulated communication channels 233 transmissions at high data rate. Each RF modulated communication channel 233 is associated with real-time bi-directional communication between a corresponding source device 140 and a corresponding destination device 140. Each communication channel 233 includes a plurality of data packets 800, as discussed herein.

In some embodiments, each RF modulated communication channel 233 is modulated using orthogonal frequency division multiple access (OFDMA) modulation to allow multiple. RF modulated communication channels 233 transmissions within a single antenna beam 134/136. Other modulation techniques are possible in other embodiments, for example, wideband code division multiple access (WCDMA). Highly directional antenna beams 134/136 allows for the same frequency band antenna beam 134/136 to be re-used in non-adjacent access nodes 130.

Random access channels 735 of control channel 235 may be provided to source device 140 to communicate to phased array communication network 100 during an initialization period when source device 140 is first powered on or when source device 140 is first within electrical RF signal range of access node 130. Source device 140 may request access to phased array communication network 100 by transmitting a request to control server 150 through access nodes 130 using RF modulated random access channels 735 transmitted within antenna beam 134.

FIG. 7B illustrates another embodiment of antenna beams 134/136. Antenna beams 134/136 of FIG. 7B include a plurality of RF modulated communication channels 233A-N, a plurality of RF modulated control channels 235A-M, and a plurality of RF modulated broadcast channels 237A-P. Similar to FIG. 7A, each RF modulated communication channel 233 is associated with real-time bi-directional communication between a corresponding source device 140 and a corresponding destination device 140.

RF modulated control channels 235A-M provide for communication between access nodes 130, and between user devices 140 and phased array communication network 100. For example, control server 150 may provide a response (e.g., such as response 806I of FIG. 8B) to source device 140 in response to a request to access network 100, via control channel 235 transmitted within antenna beam 136 through access nodes 130 to source device 140. Transmission delay information (e.g., such as transmission delay 806H of FIG. 8B) may be transmitted to each access node 130 within a route path of a communication between source device 140A and destination device 140B.

RF modulated broadcast channels 237A-P provide for communication between control server 150 and access nodes 130 of phased array communications network 100. For example, control server may transmit available communication channels 233 to each access node 130 within network 130 via broadcast channel 237 transmitted within antenna beam 136.

FIG. 8A illustrates a block diagram of a data packet 800 in accordance with an embodiment of the disclosure. Data packet 800 is provided by source device 140A and/or destination device 140B to communicate data and/or voice data between devices 140A/140B. Data packet 800 is transmitted via RF modulated communication channel 233 and passed between corresponding source device 140A and destination device 140B by antenna beams 134/136.

Data packet 800 includes header 802 and payload data 804. Header 802 includes a user identification 802A, a user location 802B, a destination identification 802C, a destination location 802D, an authentication request 802E, an access request 802F, a handover request 802G, an allocated bandwidth 802H, an assigned communication channel 802I, a time and bandwidth request 802J, a route information 802K, and an access node transmission delay 802L. In some embodiments, header 802 may be modulated using binary phase-shift keying (BPSK) modulation. BPSK provides for a less complex modulation and simplifies demodulation of header 802 at access node 130.

Header 802 provides information associated with routing data packet 800 through phased array communication network 100 to destination device 140B. For example, header 802 provides source device 140A identification and location, destination devise 140B identification and location, and route information 802K to identify a route path. In some embodiments, header 802 is demodulated at a first access node 130 to identify a route path through a plurality of access nodes 130 and no further remodulation/demodulation is required throughout the remainder of the route path. In some embodiments, a route path is reconfigured to reduce a transmission delay and reconfigured route information 802K is provided to header 802.

Payload data 804 may include voice data and/or other forms of digital and/or analog data, for example. Payload data is RF modulated and transmitted to destination device 140B as part of data packet 800. Payload data 804 is not demodulated until data packet 800 reaches destination device 140B. In this regard, transmitting payload data 804 to destination device 140B in RF modulated format provides for high data rate mobile wireless communication.

FIG. 8B illustrates a block diagram of a control channel 235 in accordance with an embodiment of the disclosure. Control channel 235 includes a system identification 806A (e.g., phased array communication network 100), an authentication status 806B, an access request acknowledge 806C, an assigned bandwidth 806D, an assigned channel 806E, a route information 806F, an access node identification 806G, a transmission delay information 806H, and a response 806I.

In various embodiments, control channel 235 (235A, 235B) provides bi-directional communication between control server 150, access nodes 130, and user devices 140. For example, RF modulated control channel 235 may transmit transmission delay information 806H, as provided by control server 150, to access nodes 130. In another example, RF modulated control channel 235 may transmit reconfigured route information 806F, as provided by control server 150, to each of access nodes 130 along the route path. In another example, RF modulated control channel 235 may transmit the response to source device 140A.

FIG. 8C illustrates a block diagram of a broadcast channel 237 in accordance with an embodiment of the disclosure. Broadcast channel 237 includes a system identification 808A (e.g., phased array communication network 100), an available bandwidth 808B, available channels 808C, pilot tones 808D, handover information 808E, and a call notification 808F.

In various embodiments, broadcast channel 237 provides bi-directional communication between control server 150 and access nodes 130. Broadcast channel 237 provides, for example, available bandwidth 808B and available channels 808C, as provided by control server 150, to access nodes 130 via antenna beams 134/136. Furthermore, broadcast channel may provide pilot tones 808D to access nodes 130 for use in determining signal strength of a user device 140 in proximity of access node 130. In some embodiments, broadcast channel 237 may provide a call notification to a user device 140 connected to network 100.

FIG. 9A illustrates an example of a route path through a plurality of access nodes 130 in accordance with an embodiment of the disclosure. As shown in FIG. 9A, source device 140A and destination device 140B are in communication over network 100. In the embodiment shown, each access nodes 130A-C includes a plurality of highly directive antenna beams 134/136 radiating circumferentially from each of access nodes 130A-C.

A route path between source device 140A and destination device 140B through network 100 includes access nodes 130A-C. A plurality of antenna beams 134A-D and 136A-D provided by phased array antennas 132 (not shown) include communication channel 233 (not shown) to transmit a plurality of data packets 800 between corresponding source device 140A and corresponding destination device 140B.

In some embodiments, route information 802K is provided and access nodes 130 select and transmit antenna beams 134/136 according to route information 802K. For example, access node 130B receives antenna beam 134B from access node 130A. Access node 130B selects phased array antenna 132 directed toward access node 130C to transmit antenna beam 134C to access node 130C. In some embodiments, antenna beam 134C of access node 130B is electronically steered to access node 130C.

In some embodiments, each access node 130A-C identifies a route to another access node 130 based on the location of destination device 140B (e.g., destination device location 802D of header 802) and proximity of access nodes 130 to destination device 140B. For example, access node 130B may identify access node 130O as the closest access node to destination device 140B. In this regard, access node 130B transmits antenna beam 134C toward access node 130C in the direction of destination device 140B.

In some embodiments, transmission of antenna beams 134A-D and 136A-D from source device 140A to destination device 140B may be established for a pre-defined duration and bandwidth. In other embodiments, the duration of transmission of antenna beams 134A-D and 136A-D from source device 140A to destination device 140B is continuous until communication between devices 140A and 140B is terminated.

FIG. 9B illustrates an example of a route path through a single access node 130 in accordance with an embodiment of the disclosure. As shown in FIG. 9B, source device 140A and destination device 140B are in communication through single access node 130A. Both source device 140A and destination device 140B are in electrical RF signal range of access node 130A. In this regard, access node 130A provides antenna beams 134N/136N to source device 140A and antenna beams 134O/136O to destination device 140B to transmit and receive data packets 800 between devices. Single access node routing provides for efficient communication between devices as transmissions do not require additional access nodes 130 in the route path. Furthermore, beamsteering can be utilized to provide for highly directive antenna beams 134N/136N and 134O/136O for high data rate.

In some embodiments, as destination device 140B moves to a different location within access node 130A, electrical RF signal strength may weaken at the original location and access node 130A antenna beams 134O/136O may track and move with device 140B within access node 130A. In this regard, access node 130A may select a different phased array antenna 132 to provide antenna beams 134O/136O.

As shown in FIGS. 9A and 9B, antenna beams 134/136 can be re-used in non-adjacent locations within access nodes 130 and non-adjacent locations between access nodes 130 to increase capacity in phased array communication network 100.

Figure 9C:
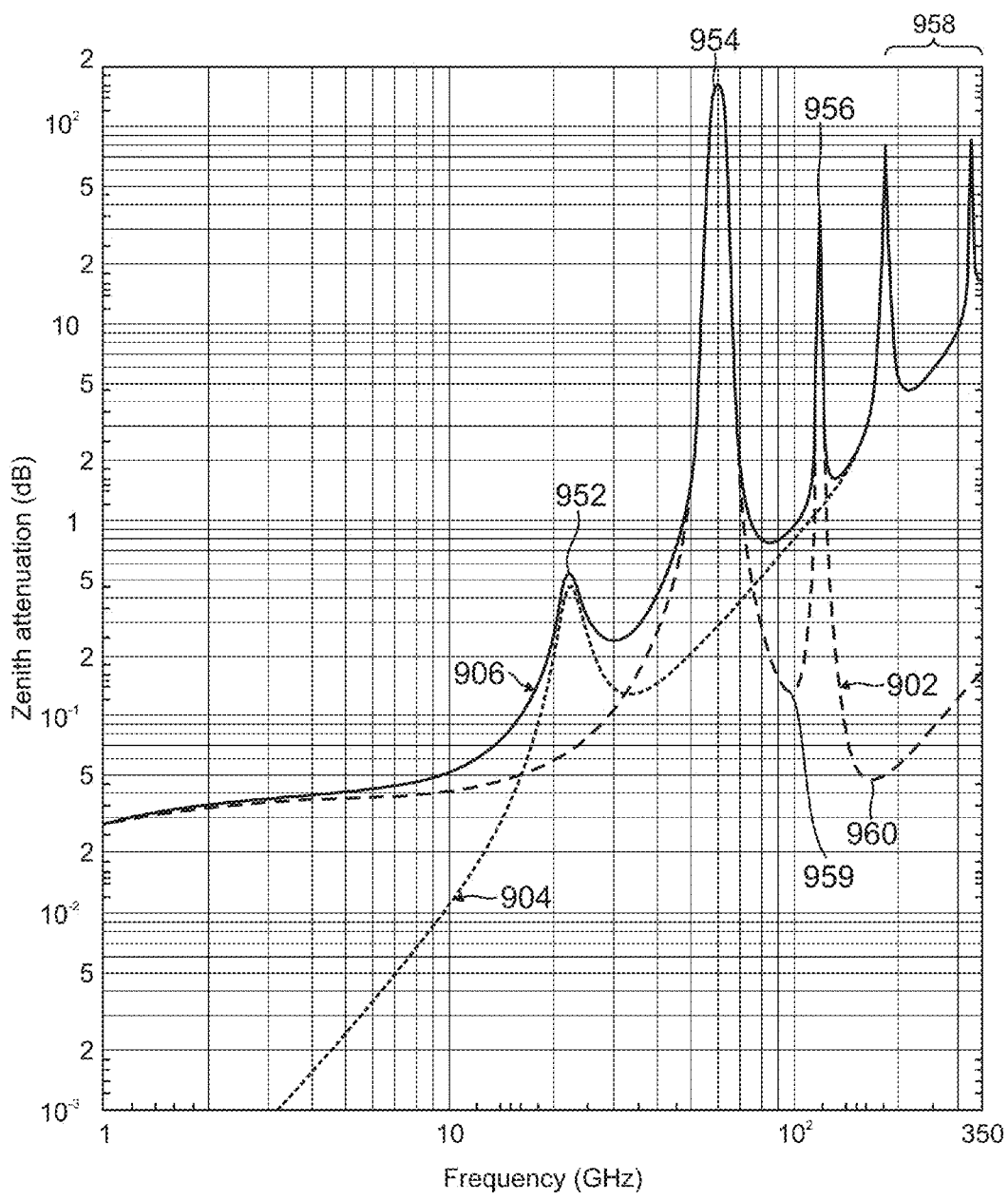
FIG. 9C illustrates several plots of attenuation versus frequency for various types of atmospheric effects in accordance with an embodiment of the disclosure.

FIG. 9C illustrates several plots of attenuation versus frequency for various types of atmospheric effects in accordance with an embodiment of the disclosure. Plot 902 illustrates attenuation effects on radiated signals traveling through dry air over a range of approximately 1 gigahertz (GHz) to approximately 350 GHz. Plot 904 illustrates attenuation effects on radiated signals traveling through water vapor over a range of approximately 3 GHz to approximately 350 GHz. Plot 906 illustrates the total zenith attenuation effect on radiated signals over a range of approximately one GHz to approximately 350 GHz. In various embodiments, such zenith attenuation information may be used to predict the attenuation that may be exhibited by phased array antenna beams used for terrestrial communication and low elevation angles.

Generally, operating phased array communication network 100 at higher frequency bands (e.g., at shorter wavelengths) provides for improved performance of mobile wireless communications. For example, operation at high RF bands (e.g., in a range of 10 GHz to 110 GHz) allows for dimensionally smaller phased array antennas 632 with many high gain antenna elements 638. Greater numbers of antenna elements 638 provide for generating narrower antenna beams 134/136 resulting in increased directivity of antenna beams 134/136 transmitted and received at phased array antenna 632. However, atmospheric effects such as dry air and/or water vapor that cause attenuation of traveling antenna beams 134/136 may be considered in choosing a preferred RF band. In this regard, by combining and intersecting frequency, wavelength, antenna dimensional considerations, and favorable atmospheric attenuation, a preferred operating RF band may be determined.

Plots 902, 904, and 906 demonstrate generally increasing attenuation from approximately 3 GHz to approximately 350 GHz with peaks and nulls of attenuation. In this regard, to reduce atmospheric effects of antenna beams 134/136 traveling a longer distance, frequencies with attenuation nulls may be chosen, preferably at higher RF bands. Plots 904 and 906 both exhibit an increase in attenuation from approximately 20 GHz to approximately 30 GHz with an attenuation peak 952 of approximately five tenths of a decibel (dB) at approximately 23 GHz. Plots 902 and 906 both exhibit attenuation peak 954 at approximately 60 GHz, and attenuation peak 956 at approximately 130 GHz. Plots 904 and 906 both exhibit several attenuation peaks 958 from approximately 180 GHz to approximately 320 GHz.

As shown, radiated signals exhibit significantly reduced attenuation over a range from approximately 65 GHz to approximately 110 GHz. In particular, plot 902 exhibits significantly reduced attenuation at 94 GHz (e.g., denoted by element number 959) and nearby frequencies (e.g., such as at approximately 150 GHz denoted by element number 960).

Thus, by operating phased array communication network 100 with antenna beams 134/136 within a frequency range of approximately 65 GHz to approximately 110 GHz (and preferably at or near 94 GHz), high bandwidth and high data rates may be achieved with improved radiated signal performance (e.g., less attenuation due to atmospheric effects). Furthermore, dimensionally smaller phased array antennas 632 are possible at operating frequencies of approximately 65 GHz to approximately 110 GHz (e.g., W band) resulting in high gain, narrow antenna beams 134/136 with increased directivity. While W band may provide improved performance, phased array communication network 100 may be operated at other RF bands, for example, at any one or more frequencies in a range from 500 megahertz (MHz) to 110 GHz, preferably in an RF band from 10 GHz to 50 GHz.

Figure 10:
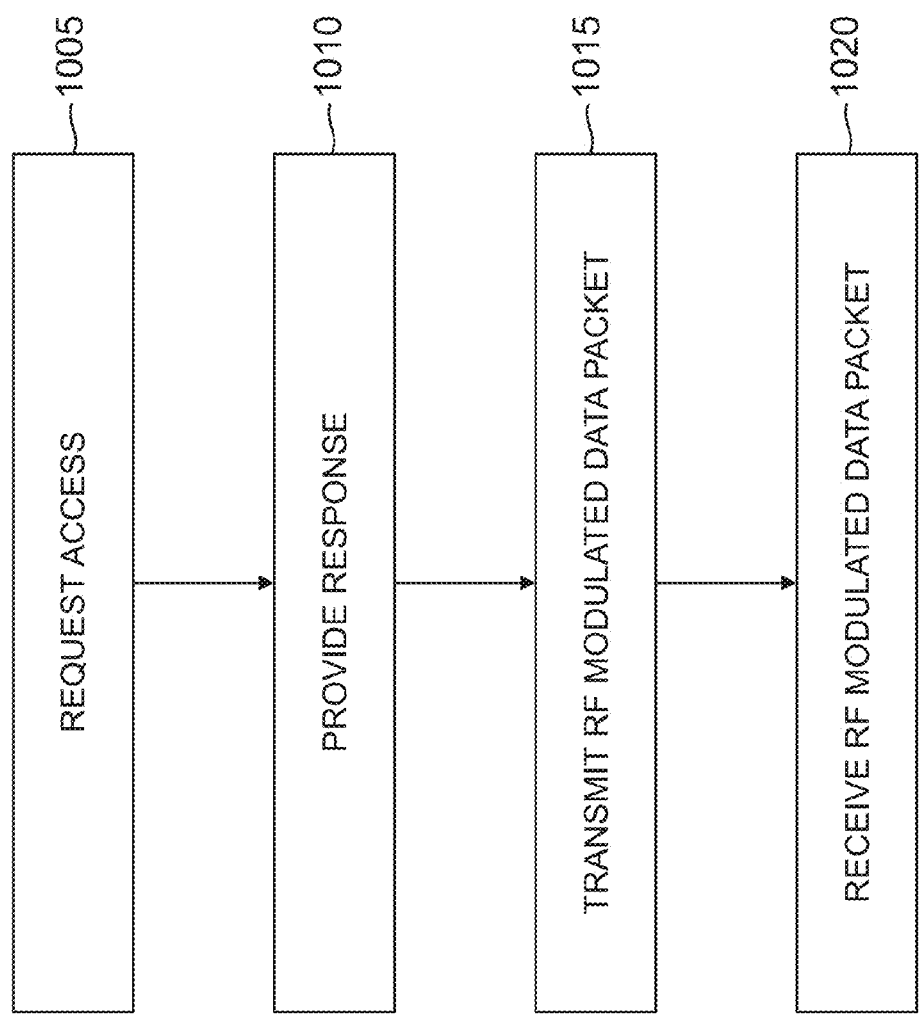
FIG. 10 illustrates a process of using a phased array communication network in accordance with an embodiment of the disclosure.

FIG. 10 illustrates a process of using a phased array communication network 100 in accordance with an embodiment of the disclosure.

In block 1005, in some embodiments, a source device 140A may initialize at power-on and request access to phased array communication network 100. In other embodiments, source device 140A may move within proximity of phased array communication network 100 and request access. An access request 802F is transmitted from source device 140A via a control channel 235 included in an RF modulated antenna beam 134 to an access node 130 of phased array communication network 100. A plurality of identified access nodes 130 transmit RF modulated antenna beams 134 along a predefined route path to a control server 150 to provide control server 150 with request to access 802F.

In block 1010, a control server 150 provides a response including a communication channel 233, a bandwidth, and identifies route information. Control server 150 provides the response to a control channel 235. Control channel 235 is RF modulated and transmitted from access nodes 130 to source device 140A via an RF modulated antenna beam 136.

In block 1015, source device 140A generates a data packet 800 including a header 802 and payload data 804. Header 802 includes route information 802K including a route path identifying a plurality of access nodes 130. Data packet 800 is RF modulated and transmitted from source device 140A to access node 130 via an RF modulated antenna beam 134.

In block 1020, source device 140A receives an RF modulated data packet 800 from a destination device 140B. In this regard, a second phased array antenna beam 136A is transmitted from access node 130. Second phased array antenna beam 136A includes a plurality of RF modulated communication channels 233. One of the plurality of RF modulated communication channels 233 includes a second RF modulated data packet 800 comprising a second payload data 804 provided by the destination device 140B.

Figure 11:
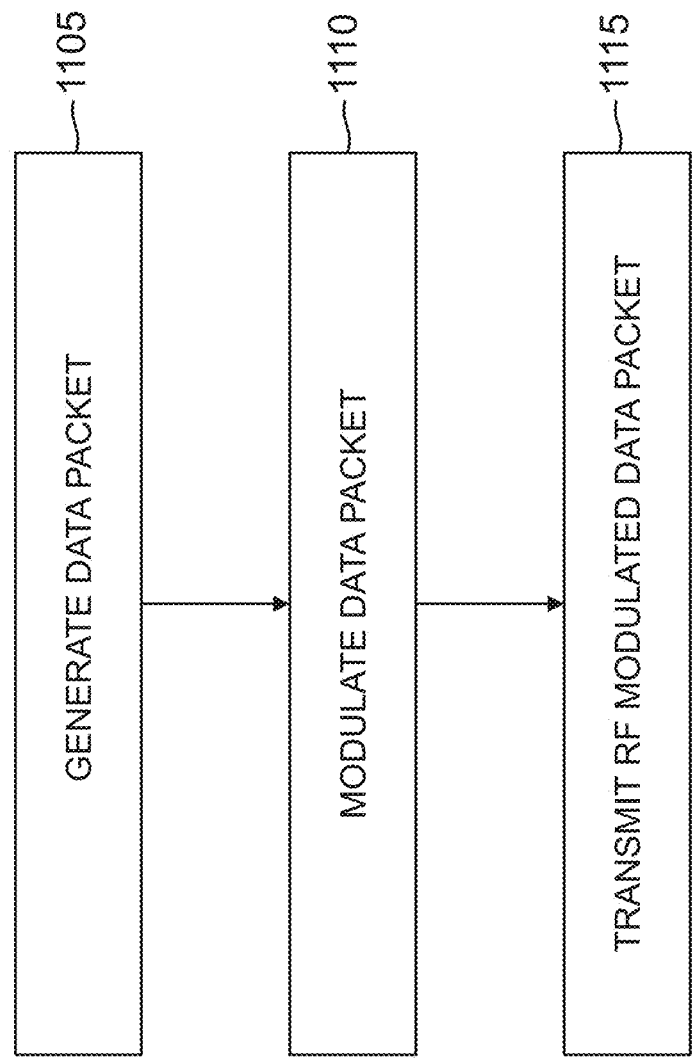
FIG. 11 illustrates a process of a user device interfacing with a phased array communication network in accordance with an embodiment of the disclosure.

FIG. 11 illustrates a process of a source device 140A interfacing with a phased array communication network 100 in accordance with an embodiment of the disclosure.

In block 1105, a source device 140A generates a data packet 800. Data packet 800 includes a header 802 and payload data 804. Header 802 includes a source device 140A identification, a destination device 104B identification, and route information 802K. In some embodiments, payload data 804 may include voice data and/or other forms of digital or analog signals.

In block 1110, data packet 800 is radio frequency (RF) modulated by source device 140A. In some embodiments, time division multiple access (TDMA), frequency division multiple access (FDMA) and/or code division multiple access (CDMA) modulation may be used to modulate payload data 804 portion of data packet 800. In other embodiments, payload data 804 is modulated using orthogonal frequency division multiple access (OFDMA) modulation. Other modulation techniques are possible in other embodiments, for example, wideband code division multiple access (WCDMA). In some embodiments, binary phase-shift keying (BPSK) modulation is used to modulate header 802.

In block 1115, RF modulated data packet 800 is transmitted to access node 130 by source device 140A. In some embodiments, source device 140A includes a phased array antenna 460. Phased array antenna forms an antenna beam 134 and transmits RF modulated data packet 800 via antenna beam 134 to access node 130.

Figure 12:
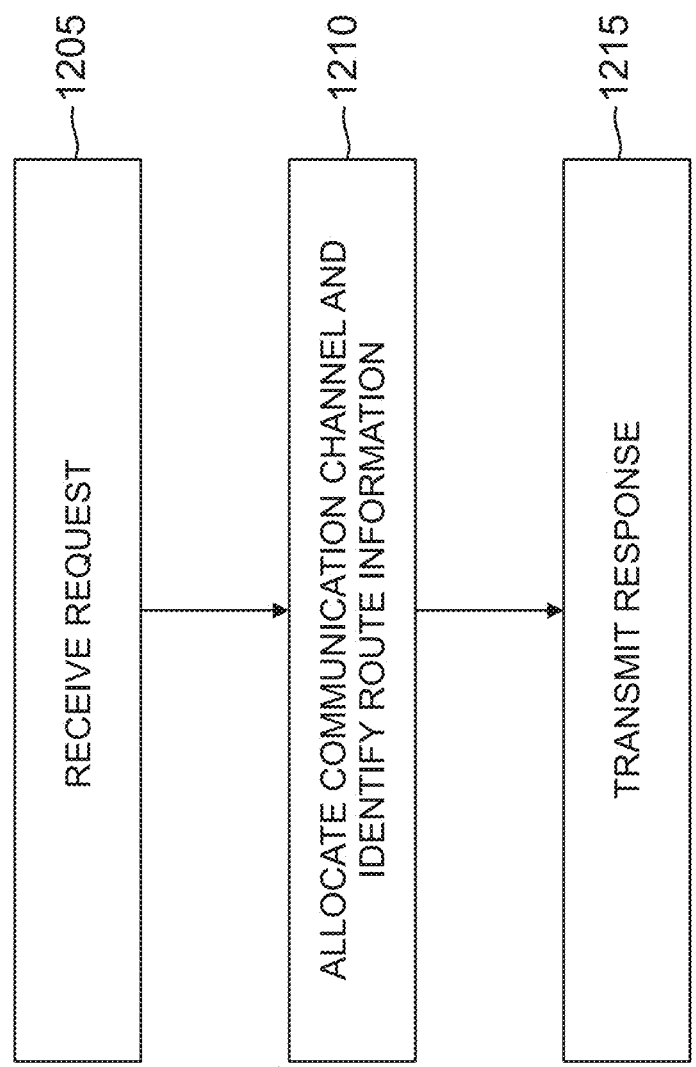
FIG. 12 illustrates a process of a control server interfacing with a phased array communication network in accordance with an embodiment of the disclosure.

FIG. 12 illustrates a process of a control server 150 interfacing with a phased array communication network in accordance with an embodiment of the disclosure.

In block 1205, a control server 150 receives a request to access phased array communication network 100 from source device 140A. Source device 104A may have powered-on and transmitted an RF signal requesting access to access node 130 in proximity of source device 140A. The request includes source device 140A identification information and destination device 140B identification information. Access node 130 subsequently transmits the request to control server 150.

In block 1210, control server 150 authenticates source 140A. After authentication, control server 105 allocates a communication channel 233, a bandwidth, and route information. Route information includes route path including a plurality of access nodes.

In block 1215, control server 150 provides communication channel 233, bandwidth, and route information to a control channel 235. Control channel 235 is RF modulated and is transmitted to access node 130 via antenna beam 136. Access node 130 transmits antenna beam 136 including RF modulated control channel 235 to source device 140A.

Figure 13:
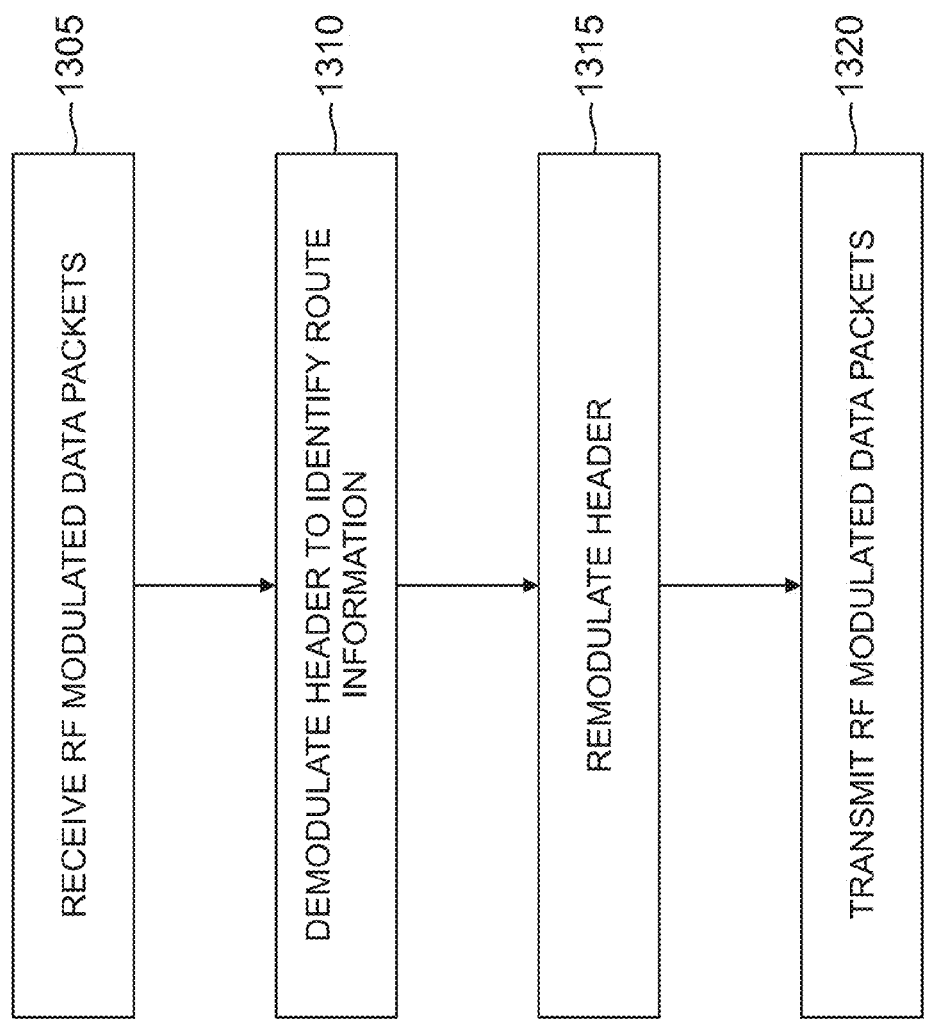
FIG. 13 illustrates a process of a predetermined RF modulated data packet route path through a phased array communication network in accordance with an embodiment of the disclosure.

FIG. 13 illustrates a process of a predetermined RF modulated data packet 800 route path through a phased array communication network 100 in accordance with an embodiment of the disclosure.

In block 1305, access node 130 receives a plurality of RF modulated data packets 800 via an antenna beam 134 originating from source device 140A. RF modulated data packet 800 includes RF modulated header 802 and payload data 804.

In block 1310, access node demodulates header 802 while maintaining payload data 804 in RF modulated format. In some embodiments, header 802 of only a selected subset of RF modulated data packets 800 is demodulated. Header 802 includes route information 802K including a route path identifying a plurality of access nodes 130. Access node 130 determines the route information 802K from the demodulated header 802. In some embodiments, header 802 is not required to be demodulated as header 802 has not been previously updated. In this regard, RF modulated header 802 may be only sampled to verify route information 802K.

In block 1315, access node 130 may remodulate header 802 to provide RF modulated data packet 800 for transmission from access node 130. In some embodiments, header 802 has been not been demodulated and remodulation is not required.

In block 1320, access node 130 transmits via an antenna beam 136, the RF modulated data packets 800 in accordance with route information 802K. In this regard, access node 130 may select one of a plurality of phased array antennas 132 of access node 130 directed toward an identified access node 130 along the route path. Antenna beam 136 is transmitted from the selected phased array antenna 132.

Figure 14:
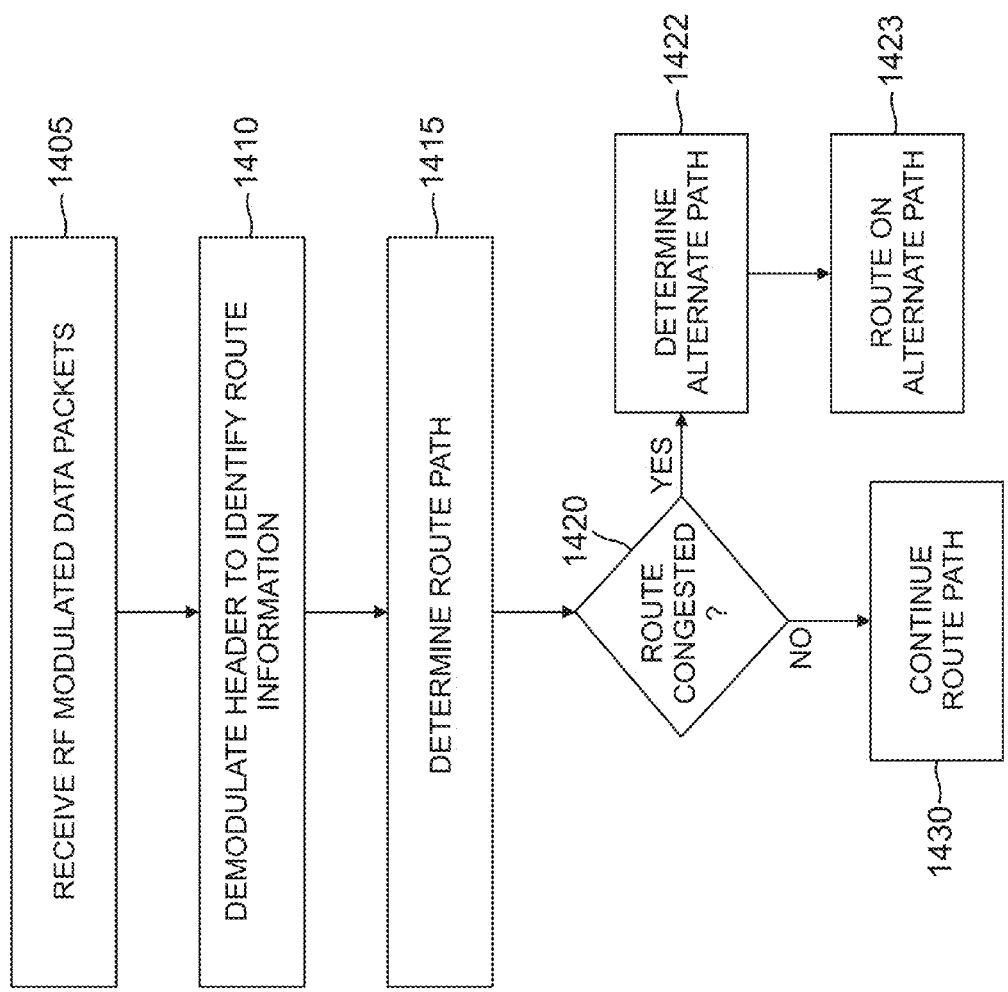
FIG. 14 illustrates a process of a dynamic RF modulated data packet route through a phased array communication network in accordance with an embodiment of the disclosure.

FIG. 14 illustrates a process of a dynamic RF modulated data packet 800 route through a phased array communication network 100 in accordance with an embodiment of the disclosure.

In block 1405, access node 130 receives a RF modulated data packet 800 via an antenna beam 134 from source device 140A. RF modulated data packet 800 includes RF modulated header 802 and payload data 804.

In block 1410, access node 130 demodulates header 802 while maintaining payload data 804 in RF modulated format. Header 802 includes source device 140A identification information, destination device 140B identification information, and route information 802K. In some embodiments, header 802 is not required to be demodulated as header 802 has not been updated. In this regard, RF modulated header 802 may be sampled to verify route information 802K.

In block 1415, access node 130 determines route information 802K from demodulated header 802.

In block 1420, access node 130 determines if a transmission delay exists on the determined route. Transmission delay for each access node 130 may be provided to access node 130 by an RF modulated control channel 235.

In block 1422, if it is determined there is a transmission delay, access node 130 may identify at least one different access node 130 to reduce the transmission delay associated with access nodes 130 identified by the route path and reconfigure header 802 with updated route information 802K. Header 802, including updated route information, may be remodulated to provide an RF modulated data packet 800.

In some embodiments, control server 150 may reconfigure route information 806F by identifying at least one different access node 130 to reduce the transmission delay. In this regard, the updated route information 806F may be transmitted by control channel 235 to access nodes 130 identified in the route path of reconfigured route information 806F.

In block 1423, RF modulated data packet 800 is transmitted in accordance with reconfigured route information 802K.

In block 1430, RF modulated data packet 800 is transmitted in accordance with route information 802K of block 1410.

In view of the present disclosure, it will be appreciated that routing wireless mobile communication signals using a phased array communication network in accordance with various embodiments set forth herein may provide for high bandwidth, high data rate, and high capacity wireless mobile communications in high capacity demand areas. In this regard, by transmitting RF modulated data packets through the network without demodulating to baseband, reconfiguring a route path to reduce a transmission delay, and selectively routing high bandwidth narrow RF antenna beams including a plurality of RF modulated data packets, reliable and efficient wireless mobile communications may be implemented in densely populated urban areas.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
receiving, by a first phased array antenna beam at an access node of a phased array communication network, a radio frequency "RF" modulated data packet comprising a header and payload data;
demodulating the header while maintaining the payload data in RF modulated format;
identifying route information within the demodulated header; and
transmitting, by a second phased array antenna beam from the access node in accordance with the route information, the RF modulated data packet.

2. The method of claim 1, wherein:
the route information comprises a route path identifying a plurality of access nodes; and
the transmitting comprises transmitting the RF modulated data packet to one of the access nodes identified by the route path.

3. The method of claim 2, further comprising:
reconfiguring the route information to identify at least one different access node to reduce a transmission delay associated with the access nodes identified by the route path; and
wherein the transmitting is performed in accordance with the reconfigured route information.

4. The method of claim 3, wherein:
at least the first antenna beam comprises an RF modulated control channel comprising transmission delay information provided by a control server; and
the reconfiguring is performed using the transmission delay information.

5. The method of claim 3, further comprising RF modulating the reconfigured route information to update the RF modulated data packet prior to the transmitting.

6. The method of claim 1, wherein the transmitting comprises electronically steering the second phased array antenna beam toward one of the access nodes identified by the route information.

7. The method of claim 1, further comprising:
selecting, based on the route information, one of a plurality of phased array antennas of the access node; and
wherein the transmitting comprises transmitting the second phased array antenna beam from the selected phased array antenna.

8. The method of claim 1, wherein:
each of the antenna beams comprises a plurality of RF modulated communication channels; and
each of the RF modulated communication channels comprises a plurality of the RF modulated data packets passed between a corresponding source device and a corresponding destination device in accordance with the route information.

9. The method of claim 8, wherein the headers of the RF modulated data packets identify the corresponding source device and the corresponding destination device associated with each of the RF modulated communication channels.

10. The method of claim 1, wherein the route information comprises a location associated with a destination device.

11. The method of claim 1, wherein the transmitting comprises transmitting the RF modulated data packet for a pre-defined duration and bandwidth.

12. The method of claim 1, the method further comprising remodulating the header to provide the RF modulated data packet for transmission from the access node.

13. The method of claim 1, the method further comprising:
receiving, by the first phased array antenna beam at the access node, a plurality of the RF modulated data packets;
demodulating the header of only a selected subset of the RF modulated data packets; and
transmitting, by the second phased array antenna beam from the access node, the RF modulated data packets.

14. The method of claim 1, wherein the first phased array antenna beam and the second phased array antenna beam operate at RF carrier frequencies in a range from approximately sixty-five gigahertz "GHz" to approximately one hundred ten GHz.

15. A system comprising:
an access node comprising:
a first antenna configured to receive a first phased array antenna beam comprising a radio frequency "RF" modulated data packet, wherein the RF modulated data packet comprises a header and payload data;
a demodulator circuit configured to demodulate the header of the RF modulated data packet, while maintaining the payload data in RF modulated format, to identify route information; and
a second antenna configured to transmit a second phased array antenna beam comprising the RF modulated data packet in accordance with the route information.

16. The system of claim 15, wherein:
the route information comprises a route path identifying a plurality of access nodes; and
the RF modulated data packet is transmitted by the second phased array antenna beam to one of the access nodes identified by the route path.

17. The system of claim 16, further comprising:
a memory configured to store a plurality of executable instructions;
a processor configured to execute the instructions to:
reconfigure the route information to identify at least one different access node to reduce a transmission delay associated with the access nodes identified by the route path; and
the second antenna is configured to transmit the second phased array antenna beam in accordance with the reconfigured route information.

18. The system of claim 17, further comprising an RF modulated control channel, wherein:
at least the first phased array antenna beam comprises the RF modulated control channel;
the RF modulated control channel comprises transmission delay information provided by a control server; and
the route information is reconfigured using the transmission delay information.

19. The system of claim 17, further comprising a modulator circuit, wherein the reconfigured route information is RF modulated by the modulator circuit prior to transmission of the second phased array antenna beam.

20. The system of claim 17, further comprising a beam steering circuit configured to electronically steer the second phased array antenna beam toward one of the access nodes identified by the route information, wherein the processor is configured to provide a steering control signal to the beam steering circuit.

21. The system of claim 15, further comprising an RF array switch matrix, wherein the RF array switch matrix is configured to select one of a plurality of antennas to transmit the second phased array antenna beam from the selected antenna.

22. The system of claim 15, wherein:
each of the antenna beams comprises a plurality of RF modulated communication channels; and
each of the RF modulated communication channels comprises a plurality of the RF modulated data packets passed between a corresponding source device and a corresponding destination device in accordance with the route information.

23. The system of claim 22, wherein the headers of the RF modulated data packets identify the corresponding source device and the corresponding destination device associated with each of the RF modulated communication channels.

24. The system of claim 15, wherein the route information comprises a location associated with a destination device.

25. The system of claim 15, wherein the RF modulated data packet is transmitted for a pre-defined duration and bandwidth.

26. The system of claim 15, further comprising a modulator circuit, wherein the header is remodulated by the modulator circuit prior to transmission from the second antenna.

27. The system of claim 15, further comprising:
the first phased array antenna beam comprises a plurality of RF modulated data packets;
the header of only a selected subset of the RF modulated data packets is demodulated; and
the RF modulated data packets are transmitted by the second phased array antenna beam.

28. The system of claim 15, wherein the first phased array antenna beam and the second phased array antenna beam operate at RF carrier frequencies in a range from approximately sixty-five gigahertz "GHz" to approximately one hundred ten GHz.

* * * * *